United States Patent
Je et al.

(10) Patent No.: US 12,116,713 B2
(45) Date of Patent: Oct. 15, 2024

(54) DRAIN PUMP DRIVING APPARATUS AND LAUNDRY TREATMENT MACHINE INCLUDING THE SAME

(71) Applicant: LG ELECTRONICS INC., Seoul (KR)

(72) Inventors: Jungmoon Je, Seoul (KR); Chungill Lee, Seoul (KR); Kiwook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 814 days.

(21) Appl. No.: 17/048,927

(22) PCT Filed: Apr. 19, 2019

(86) PCT No.: PCT/KR2019/004737
§ 371 (c)(1),
(2) Date: Oct. 19, 2020

(87) PCT Pub. No.: WO2019/203604
PCT Pub. Date: Oct. 24, 2019

(65) Prior Publication Data
US 2021/0156066 A1    May 27, 2021

(30) Foreign Application Priority Data
Apr. 19, 2018 (KR) .................. 10-2018-0045751

(51) Int. Cl.
*D06F 33/42* (2020.01)
*D06F 39/08* (2006.01)
(Continued)

(52) U.S. Cl.
CPC ............ *D06F 33/42* (2020.02); *D06F 39/085* (2013.01); *F04D 27/004* (2013.01); *D06F 34/08* (2020.02);
(Continued)

(58) Field of Classification Search
CPC ........ D06F 39/085; D06F 33/42; F04D 27/004
See application file for complete search history.

(56) References Cited

U.S. PATENT DOCUMENTS

| 4,511,312 A | * | 4/1985 | Hartwig | ................. H02K 11/33 |
| | | | | 417/45 |
| 2007/0113595 A1 | * | 5/2007 | Harwood | .............. D06F 39/087 |
| | | | | 68/12.01 |

(Continued)

FOREIGN PATENT DOCUMENTS

| CN | 107304513 | 10/2017 |
| DE | 10-2016-216737 | 3/2018 |

(Continued)

OTHER PUBLICATIONS

European Search Report dated Dec. 22, 2021 issued in Application No. 19787723.6.
(Continued)

*Primary Examiner* — Joseph L. Perrin
*Assistant Examiner* — Kevin G Lee
(74) *Attorney, Agent, or Firm* — KED & Associates LLP

(57) ABSTRACT

The present disclosure relates to a drain pump driving apparatus and a laundry treatment machine including the same. A drain pump driving apparatus according to an embodiment of the present disclosure includes a controller configured to drive a motor, during drainage, based on an output current and a direct current (DC) terminal voltage with a first power when a lift is at a first level and to drive the motor with the first power when the lift is at a second level that is greater than the first level, wherein the lift is a difference between a water level of a water introduction part through which water flows into a drain pump and a water level of a water discharge part through which the water is discharged out of the drain pump. Accordingly, water pump-
(Continued)

ing can be performed smoothly even if the lift is changed during the drainage.

14 Claims, 15 Drawing Sheets

(51) Int. Cl.
*F04D 27/00* (2006.01)
*D06F 34/08* (2020.01)
*D06F 34/14* (2020.01)
*D06F 103/42* (2020.01)
*D06F 103/46* (2020.01)
*D06F 103/48* (2020.01)
*D06F 105/08* (2020.01)
*F04D 25/06* (2006.01)
*H02P 6/17* (2016.01)
*H02P 6/28* (2016.01)

(52) U.S. Cl.
CPC .......... *D06F 34/14* (2020.02); *D06F 2103/42* (2020.02); *D06F 2103/46* (2020.02); *D06F 2103/48* (2020.02); *D06F 2105/08* (2020.02); *F04D 25/06* (2013.01); *H02P 6/17* (2016.02); *H02P 6/28* (2016.02)

(56) References Cited

U.S. PATENT DOCUMENTS

| | | | |
|---|---|---|---|
| 2011/0223038 A1* | 9/2011 | Ogawa | F04D 15/0066 417/45 |
| 2012/0006065 A1* | 1/2012 | Jung | H02P 27/085 68/12.02 |
| 2012/0159717 A1 | 6/2012 | Jang et al. | |
| 2017/0302208 A1 | 10/2017 | Je et al. | |

FOREIGN PATENT DOCUMENTS

| | | |
|---|---|---|
| EP | 2781640 | 9/2014 |
| JP | H01-158999 | 6/1989 |
| JP | 2586535 | 3/1997 |
| JP | 2004-135491 | 4/2004 |
| JP | 2005-160510 | 6/2005 |
| JP | 2013-244315 | 12/2013 |
| JP | 2016-140618 | 8/2016 |
| KR | 10-2006-0122562 | 11/2006 |
| KR | 10-2011-0112486 | 10/2011 |
| KR | 10-2017-0021116 | 2/2017 |
| KR | 10-1756408 | 7/2017 |
| WO | WO 2017/183886 | 10/2017 |

OTHER PUBLICATIONS

Korean Notice of Allowance dated Jul. 29, 2020 issued in Application No. 10-2018-0045751.
Chinese Office Action dated Jul. 5, 2022 issued in Application No. 201980040418.6.
International Search Report dated Aug. 2, 2019 issued in Application No. PCT/KR2019/004737.

* cited by examiner

DRAIN PUMP DRIVING APPARATUS AND LAUNDRY TREATMENT MACHINE INCLUDING THE SAME

CROSS-REFERENCE TO RELATED PATENT APPLICATIONS

This application is a U.S. National Stage Application under 35 U.S.C. § 371 of PCT Application No. PCT/KR2019/004737, filed Apr. 19, 2019, which claims priority to Korean Patent Application No. 10-2018-0045751, filed Apr. 19, 2018, whose entire disclosures are hereby incorporated by reference.

BACKGROUND OF THE DISCLOSURE

1. Field of the Disclosure

The present disclosure relates to a drain pump driving apparatus and a laundry treatment machine including the same, and more particularly, to a drain pump driving apparatus capable of performing water pumping smoothly even if a lift is changed during drainage, and a laundry treatment machine including the same.

In addition, the present disclosure relates to a drain pump driving apparatus capable of minimizing a decrease in drainage performance according to installation conditions, and a laundry treatment machine including the same.

In addition, the present disclosure relates to a drain pump driving apparatus capable of shortening a drainage time, and a laundry treatment machine including the same.

In addition, the present disclosure relates to a drain pump driving apparatus that can be driven in a sensorless manner, and a laundry treatment machine including the same.

2. Description of the Related Art

A drain pump driving apparatus drives a motor during drainage to discharge water introduced into a water introduction part to the outside.

In order to drive a drain pump, the motor is generally driven in a constant-speed operation using an input alternating current (AC) power.

For example, when a frequency of the input AC power is 50 Hz, the motor for the drain pump rotates at 3000 rpm, and when the frequency of the input AC power is 60 Hz, the motor for the drain pump rotates at 3600 rpm.

Meanwhile, a water-pumped amount varies depending on a level of a lift, which is a difference between a water level of the water introduction part through which water flows into the drain pump and a water level of a water discharge part through which the water is discharged out of the drain pump. Under this circumstance, if the motor for the drain pump operates at a constant speed, water pumping may not be performed smoothly. Thus, it has been discussed how the drain pump can be operated stably.

Korean Patent Publication No. 10-2006-0122562 discloses that speed control is performed by operating a pump in a constant-speed mode or in an inverter mode after checking a current water-pumped amount using a pressure sensor and a water level sensor.

In addition, Japanese Patent Publication No. 2004-135491 discloses details of speed control according to a speed command for driving a motor.

For the speed control, however, it is required that a power supplied to the pump be changed according to a change in the level of the lift, and accordingly, a converter need to output a wide range of power levels. As a result, the stability of the converter is reduced.

SUMMARY

An object of the present disclosure is to provide a drain pump driving apparatus capable of performing water pumping smoothly even if a lift is changed during drainage, and a laundry treatment machine including the same.

Another object of the present disclosure is to provide a drain pump driving apparatus capable of driving a converter stably even if a lift is changed during drainage, and a laundry treatment machine including the same.

Further another object of the present disclosure is to provide a drain pump driving apparatus capable of minimizing a decrease in drainage performance according to installation conditions, and a laundry treatment machine including the same.

Further another object of the present disclosure is to provide a drain pump driving apparatus capable of shortening a drainage time, and a laundry treatment machine including the same.

Further another object of the present disclosure is to provide a drain pump driving apparatus that can be driven in a sensorless manner, and a laundry treatment machine including the same.

According to an embodiment of the present disclosure, a drain pump driving apparatus or a laundry treatment machine including the same includes a controller configured to drive a motor during drainage, based on an output current and a direct current (DC) terminal voltage, with a first power when a lift is at a first level and to drive the motor with the first power when the lift is at a second level that is greater than the first level, wherein the lift is a difference between a water level of a water introduction part through which water flows into a drain pump and a water level of a water discharge part through which the water is discharged out of the drain pump.

In the drain pump driving apparatus or the laundry treatment machine including the same according to an embodiment of the present disclosure, when the lift is at the first level, the controller may be configured to drive the motor with a power within a first allowable range based on the first power, without decreasing over time, from a first time point after the drainage is started until completion of the drainage, and when the lift is at the second level, the controller may be configured to drive the motor with a power within the first allowable range based on the first power, without decreasing over time, from the first time point until completion of the drainage.

In the drain pump driving apparatus or the laundry treatment machine including the same according to an embodiment of the present disclosure, when the power supplied to the motor reaches the first power, the controller may control a speed of the motor to be constant.

In the drain pump driving apparatus or the laundry treatment machine including the same according to an embodiment of the present disclosure, a period of increase in the speed of the motor may include an initial rise section and a second rise section where the increase in the speed of the motor is less than the increase in the speed of the motor in the initial rise section when the power supplied to the motor does not reach the first power, and the controller may control the output current in the second rise section to be constant.

In the drain pump driving apparatus or the laundry treatment machine including the same according to an embodiment of the present disclosure, the controller may control an amount of water pumped by an operation of the drain pump to be decreased as a level of the lift increases during the drainage.

In the drain pump driving apparatus or the laundry treatment machine including the same according to an embodiment of the present disclosure, the controller may control the decrease in the amount of water pumped by the operation of the drain pump according to the increase in the level of the lift to be smaller when power control is performed with respect to the motor than when speed control is performed with respect to the motor.

In the drain pump driving apparatus or the laundry treatment machine including the same according to an embodiment of the present disclosure, the controller may control the power supplied to the motor, during the drainage, to be constant without decreasing over time.

In the drain pump driving apparatus or the laundry treatment machine including the same according to an embodiment of the present disclosure, the controller may control the motor such that the power control is performed when the drainage is started and the power control is terminated when a residual water level is reached.

In the drain pump driving apparatus or the laundry treatment machine including the same according to an embodiment of the present disclosure, the controller may calculate a power based on the output current and the DC terminal voltage and output a voltage command value based on the calculated power, and the second controller may output a switching control signal to the inverterbased on the voltage command value.

In the drain pump driving apparatus or the laundry treatment machine including the same according to an embodiment of the present disclosure, the controller may control the voltage command value and a duty of the switching control signal to be greater as level of the output current decreases.

In the drain pump driving apparatus or the laundry treatment machine including the same according to an embodiment of the present disclosure, the second controller may output voltage information of the motor to the controller based on the voltage command value or the switching control signal.

In the drain pump driving apparatus or the laundry treatment machine including the same according to an embodiment of the present disclosure, the controller may include: a speed calculator to calculate a speed of the motor based on the voltage information of the motor; a power calculator to calculate the power based on the output current and the DC terminal voltage; a power controller to output a speed command value based on the calculated power and a power command value; and a speed controller to output the voltage command value based on the speed command value and the speed calculated by the speed calculator.

In the drain pump driving apparatus or the laundry treatment machine including the same according to an embodiment of the present disclosure, the motor for driving the drain pump may include a brushless DC motor.

The drain pump driving apparatus or the laundry treatment machine including the same according to an embodiment of the present disclosure may further include a DC terminal capacitor storing the DC power, and the output current detector may be disposed between the DC terminal capacitor and the inverter.

According to another embodiment of the present disclosure, a drain pump driving apparatus or a laundry treatment machine including the same includes a controller configured to control a speed of a motor, during drainage, to be increased when a power supplied to the motor does not reach a first power and to be decreased when the power supplied to the motor exceeds the first power.

According to further another embodiment of the present disclosure, a drain pump driving apparatus or a laundry treatment machine including the same includes a controller configured to control a speed of a motor, during drainage, to be increased as a level of a lift increases, wherein the lift is a difference between a water level of a water introduction part through which water flows into a drain pump and a water level of a water discharge part through which the water is discharged out of the drain pump.

According to further another embodiment of the present disclosure, a drain pump driving apparatus or a laundry treatment machine including the same includes a controller configured to control a speed of a motor, during drainage, to be increased as a water level in a washing tub decreases.

Advantageous Effects

A drain pump driving apparatus or a laundry treatment machine including the same according to an embodiment of the present disclosure includes a controller configured to drive a motor during drainage, based on an output current and a direct current (DC) terminal voltage, with a first power when a lift is at a first level and to drive the motor with the first power when the lift is at a second level that is greater than the first level, wherein the lift is a difference between a water level of a water introduction part through which water flows into a drain pump and a water level of a water discharge part through which the water is discharged out of the drain pump. Accordingly, water pumping can be performed smoothly even if the lift is changed during the drainage.

In particular, since power control is performed to drive the motor with a constant power, the converter merely needs to supply the constant power. Thus, the stability of the converter can be improved.

In the drain pump driving apparatus or the laundry treatment machine including the same according to an embodiment of the present disclosure, when the lift is at the first level, the controller may be configured to drive the motor with a power within a first allowable range based on the first power, without decreasing over time, from a first time point after the drainage is started until completion of the drainage, and when the lift is at the second level, the controller may be configured to drive the motor with a power within the first allowable range based on the first power, without decreasing over time, from the first time point until completion of the drainage. Since power control is performed to drive the motor with a constant power as described above, the converter merely needs to supply the constant power. Thus, the stability of the converter can be improved.

In the drain pump driving apparatus or the laundry treatment machine including the same according to an embodiment of the present disclosure, when the power supplied to the motor reaches the first power, the controller may control a speed of the motor to be constant. Since power control is performed as described above, it is possible to minimize a decrease in drainage performance according to installation conditions.

In the drain pump driving apparatus or the laundry treatment machine including the same according to an embodiment of the present disclosure, a period of increase in the speed of the motor may include an initial rise section and a second rise section where the increase in the speed of the motor is less than the increase in the speed of the motor in the initial rise section when the power supplied to the motor does not reach the first power, and the controller may control the output current in the second rise section to be constant. Accordingly, the motor can be operated with a constant power.

In the drain pump driving apparatus or the laundry treatment machine including the same according to an embodiment of the present disclosure, the controller may control a decrease in an amount of water pumped by an operation of the drain pump as a level of the lift increases to be smaller when the power control is performed with respect to the motor than when speed control is performed with respect to the motor. Accordingly, when compared to the speed control, the power control makes it possible to set a greater range of lift levels, thereby increasing a freedom of installation.

In the drain pump driving apparatus or the laundry treatment machine including the same according to an embodiment of the present disclosure, the controller may control the controller may control the power supplied to the motor, during the drainage, to be constant without decreasing over time.

In the drain pump driving apparatus or the laundry treatment machine including the same according to an embodiment of the present disclosure, the controller may control the motor such that the power control is performed when the drainage is started and the power control is terminated when a residual water level is reached. Accordingly, the drainage operation can be efficiently performed.

In the drain pump driving apparatus or the laundry treatment machine including the same according to an embodiment of the present disclosure, the controller may calculate a power based on the output current and the DC terminal voltage and output a voltage command value based on the calculated power, and a second controller may output a switching control signal to the inverterbased on the voltage command value.

In the drain pump driving apparatus or the laundry treatment machine including the same according to an embodiment of the present disclosure, the controller may control the voltage command value and a duty of the switching control signal to be greater as level of the output current decreases. Accordingly, the motor can be driven with a constant power.

In the drain pump driving apparatus or the laundry treatment machine including the same according to an embodiment of the present disclosure, the controller may include: a speed calculator to calculate a speed of the motor based on voltage information of the motor; a power calculator to calculate the power based on the output current and the DC terminal voltage; a power controller to output a speed command value based on the calculated power and a power command value; and a speed controller to output the voltage command value based on the speed command value and the speed calculated by the speed calculator. Accordingly, the power control can be performed stably.

In the drain pump driving apparatus or the laundry treatment machine including the same according to an embodiment of the present disclosure, the motor for driving the drain pump may include a brushless DC motor. Accordingly, the power control, rather than constant-speed control, can be implemented in a simple manner.

The drain pump driving apparatus or the laundry treatment machine including the same according to an embodiment of the present disclosure may further include a DC terminal capacitor storing a DC power, and the output current detector may be disposed between the DC terminal capacitor and the inverter. Accordingly, the output current flowing in the motor can be detected through the output current detector in a simple manner.

According to another embodiment of the present disclosure, a drain pump driving apparatus or a laundry treatment machine including the same includes a controller configured to control a speed of a motor, during drainage, to be increased when a power supplied to the motor does not reach a first power and to be decreased when the power supplied to the motor exceeds the first power. Since power control is performed to drive the motor with a constant power, the converter merely needs to supply the constant power. Thus, the stability of the converter can be improved.

In addition, since the power control is performed, it is possible to minimize a decrease in drainage performance according to installation conditions.

In the drain pump driving apparatus or the laundry treatment machine including the same according to an embodiment of the present disclosure, when the power supplied to the motor reaches the first power, the controller may control a speed of the motor to be constant. Since the power control is performed as described above, it is possible to minimize a decrease in drainage performance according to installation conditions.

According to further another embodiment of the present disclosure, a drain pump driving apparatus or a laundry treatment machine including the same includes a controller configured to control a speed of a motor, during drainage, to be increased as a level of a lift increases, wherein the lift is a difference between a water level of a water introduction part through which water flows into a drain pump and a water level of a water discharge part through which the water is discharged out of the drain pump. Accordingly, water pumping can be performed smoothly even if the lift is changed during the drainage.

In particular, since power control is performed, it is possible to minimize a decrease in drainage performance according to installation conditions.

According to further another embodiment of the present disclosure, a drain pump driving apparatus or a laundry treatment machine including the same includes a controller configured to control a speed of a motor, during drainage, to be increased as a water level in a washing tub decreases. Accordingly, water pumping can be performed smoothly even if the water level in the washing tub decreases during the drainage.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present disclosure, examples of which are illustrated in the accompanying drawings. Wherever possible, the same reference numbers will be used throughout the drawings to refer to the same or like parts.

As used herein, the suffixes "module" and "unit" are added or used interchangeably to facilitate preparation of this specification and are not intended to suggest distinct meanings or functions. Accordingly, the terms "module" and "unit" may be used interchangeably.

Figure 1:
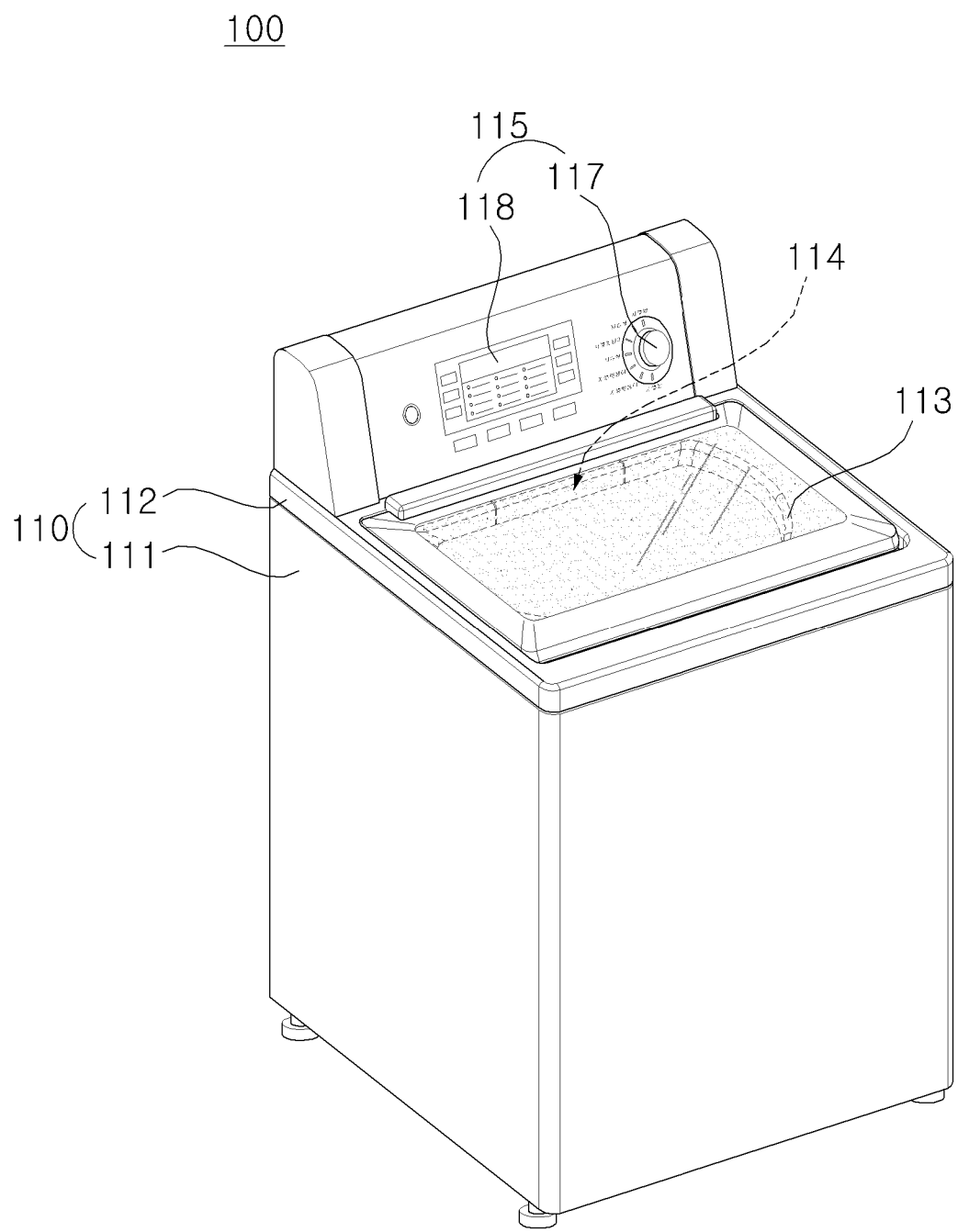
FIG. 1 is a perspective view illustrating a laundry treatment machine according to an embodiment of the present disclosure.
Figure 2:
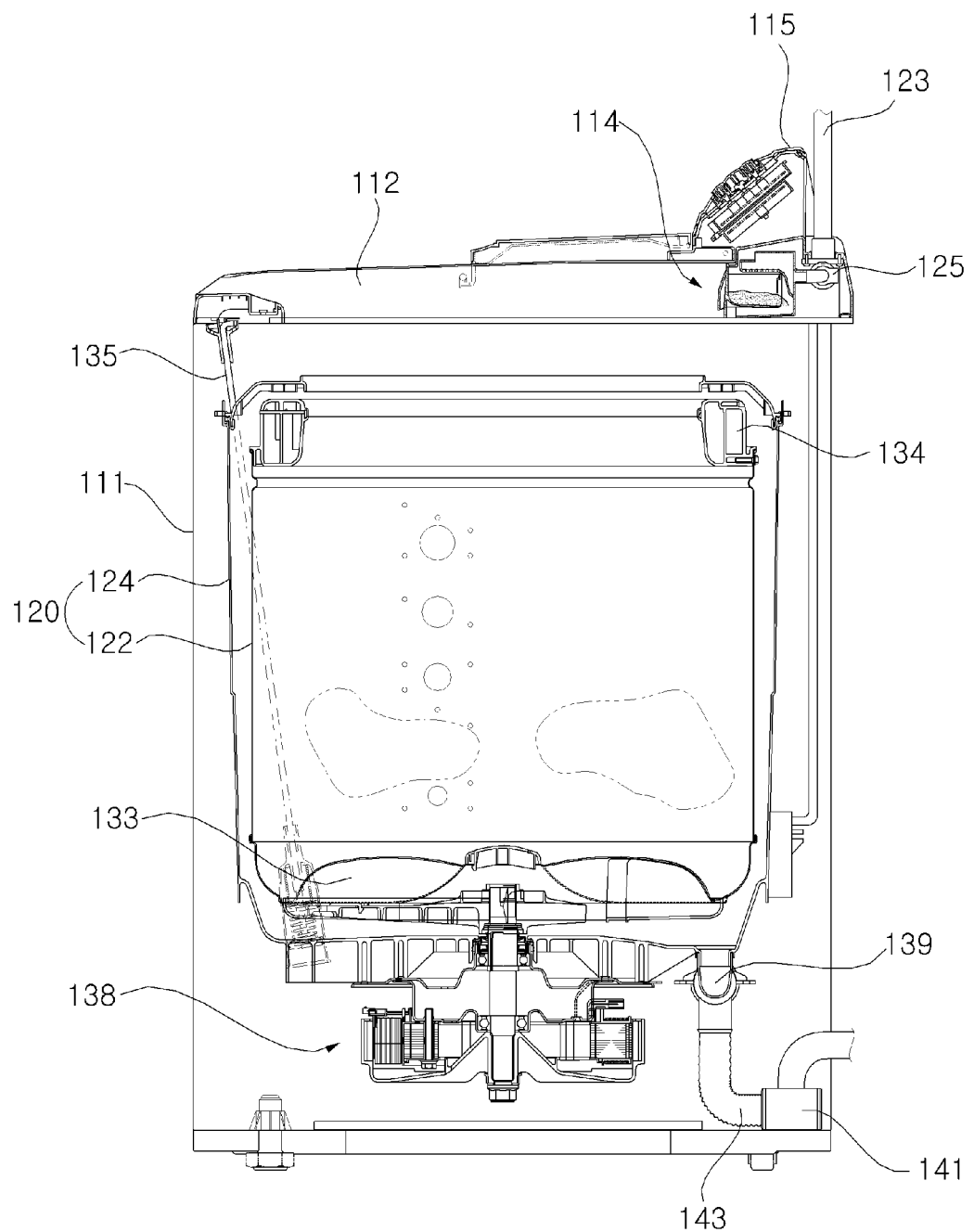
FIG. 2 is a side cross-sectional view of the laundry treatment machine of FIG. 1.

FIG. 1 is a perspective view illustrating a laundry treatment machine according to an embodiment of the present disclosure, and FIG. 2 is a side cross-sectional view illustrating the laundry treatment machine of FIG. 1.

Referring to FIGS. 1 and 2, the laundry treatment machine 100 according to an embodiment of the present disclosure conceptually includes a washing machine having fabric inserted therein for performing washing, rinsing and dewatering, or a dryer having wet fabric inserted therein. The washing machine will be mainly described below.

The washing machine 100 includes a casing 110 forming an outer appearance, operation keys for receiving various control commands from a user, and a control panel 115 equipped with a display for displaying information on the operating state of the washing machine 100 to provide a user interface, and a door 113 rotatably installed in the casing 110 to open and close an entrance hole through which the laundry enters and exits.

The casing 110 includes a body 111 for defining a space in which various components of the washing machine 100 can be accommodated and a top cover 112 provided at an upper side of the body 111 and forming a fabric entrance hole to allow the laundry to be introduced into an inner tub 122 therethrough.

The casing 110 is described as including the body 111 and the top cover 112, but the casing 110 is not limited thereto as long as it forms the appearance of the washing machine 100.

A support rod 135 is coupled to the top cover 112 which is one of the constituent elements of the casing 110. However, the support rod 135 is not limited thereto and may be coupled to any part of the fixed portion of the casing 110.

The control panel 115 includes operation keys 117 for controlling an operation state of the laundry treatment machine 100 and a display 118 disposed on one side of the operation keys 117 to display the operation state of the laundry treatment machine 100.

The door 113 opens and closes a fabric entrance hole (not shown) formed in the top cover 112 and may include a transparent member such as reinforced glass to allow the inside of the body 111 to be seen.

The washing machine 100 may include a washing tub 120. The washing tub 120 may include an outer tub 124 containing wash water and an inner tub 122 rotatably installed in the outer tub 124 to accommodate laundry. A balancer 134 may be provided at the upper portion of the washing tub 120 to compensate for unbalance amount generated when the washing tub 120 rotates.

Meanwhile, the washing machine 100 may include a pulsator 133 rotatably provided at a lower portion of the washing tub 120.

The driving apparatus 138 serves to provide a driving force for rotating the inner tub 122 and/or the pulsator 133. A clutch (not shown) for selectively transmitting the driving force of the driving apparatus 138 may be provided such that only the inner tub 122 is rotated, only the pulsator 133 is rotated, or the inner tub 122 and the pulsator 133 are rotated at the same time.

Figure 3:
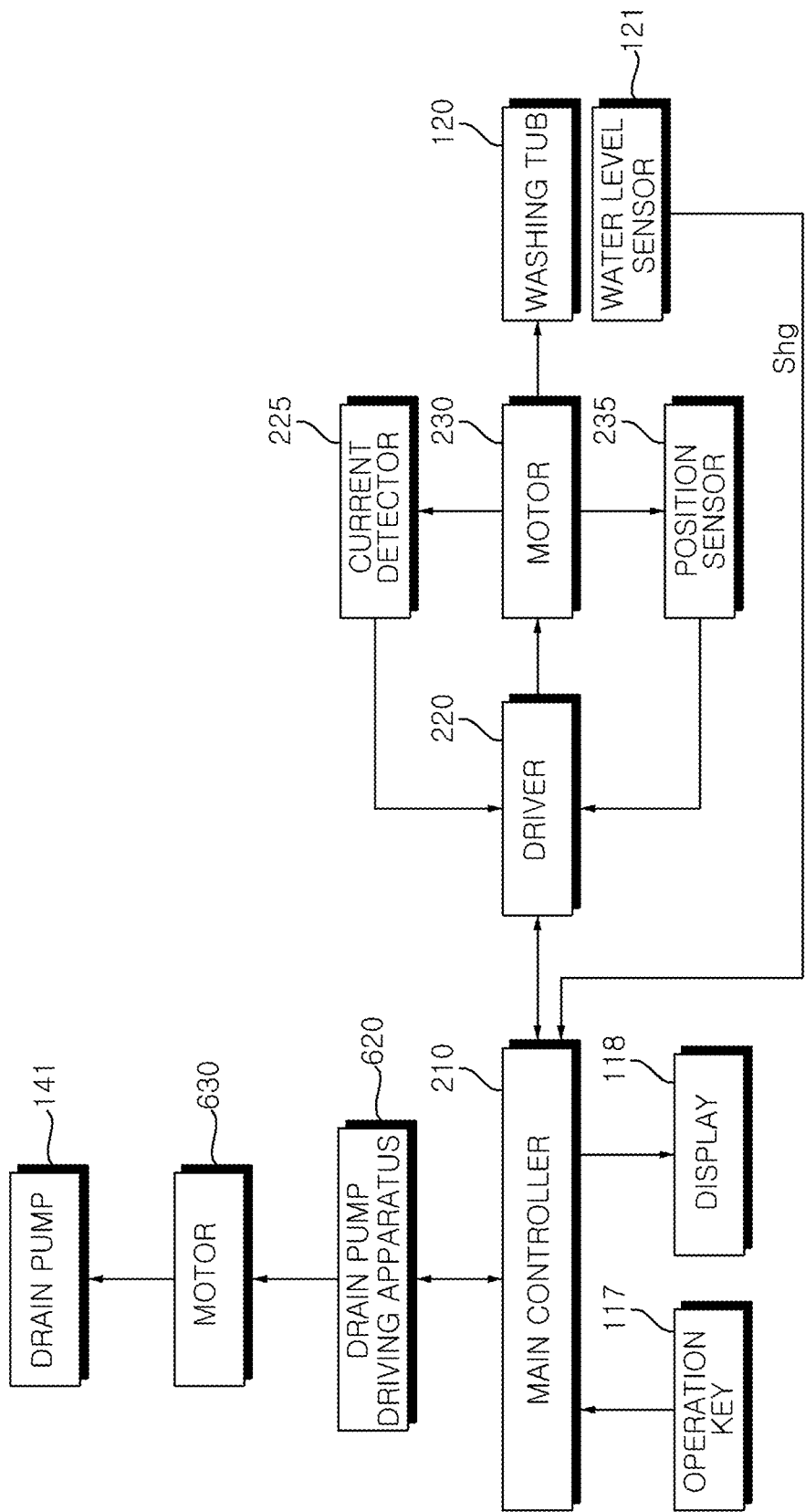
FIG. 3 is an internal block diagram of the laundry treatment machine of FIG. 1.

The driving apparatus 138 is operated by a driver 220 of FIG. 3, that is, a driving circuit. This will be described later with reference to FIG. 3 and other drawings.

A detergent box 114 for accommodating various additives such as a laundry detergent, a fabric softener, and/or a bleaching agent is retrievably provided to the top cover 112, and the wash water supplied through a water supply channel 123 flows into the inner tub 122 via the detergent box 114.

A plurality of holes (not shown) is formed in the inner tub 122. Thereby, the wash water supplied to the inner tub 122 flows to the outer tub 124 through the plurality of holes. A water supply valve 125 for regulating the water supply channel 123 may be provided.

The wash water is drained from the outer tub 124 through a drain channel 143. A drain valve 145 for regulating the drain channel 143 and a drain pump 141 for pumping the wash water may be provided.

The support rod 135 is provided to hang the outer tub 124 in the casing 110. One end of the support rod 135 is connected to the casing 110 and the other end of the support rod 135 is connected to the outer tub 124 by a suspension 150.

The suspension 150 attenuates vibration of the outer tub 124 during the operation of the washing machine 100. For example, the outer tub 124 may be vibrated by vibration generated as the inner tub 122 rotates. While the inner tub 122 rotates, the vibration caused by various factors such as unbalance laundry amount of laundry contained in the inner tub 122, the rotational speed of the inner tub 122 or the resonance characteristics of the inner tub 122 can be attenuated.

FIG. 3 is an internal block diagram of the laundry treatment machine of FIG. 1.

Referring to FIG. 3, in the laundry treatment machine 100, the driver 220 is controlled by the main controller 210, and the driver 220 drives the motor 230. Thereby, the washing tub 120 is rotated by the motor 230.

Meanwhile, the laundry treatment machine 100 may include a motor 630 for driving the drain pump 141 and a drain pump driving apparatus 620 for driving the motor 630. The drain pump driving apparatus 620 may be controlled by the main controller 210.

In this specification, the drain pump driving apparatus 620 may be referred to as a drain pump driver.

The main controller 210 operates by receiving an operation signal from an operation key 117. Accordingly, washing, rinsing, and dewatering processes may be performed.

In addition, the main controller 210 may control the display 118 to display a washing course, a washing time, a dewatering time, a rinsing time, a current operation state, or the like.

Meanwhile, the main controller 210 controls the driver 220 to operate the motor 230. For example, the main controller 210 may control the driver 220 to rotate the motor 230, based on a current detector 225 for detecting an output current flowing in the motor 230 and a position sensor 235 for sensing a position of the motor 230. While it is illustrated in FIG. 3 that the detected current and the sensed position signal are input to the driver 220, embodiments of the present disclosure are not limited thereto. The detected current and the sensed position signal may be input to the main controller 210 or to both the main controller 210 and the driver 220.

The driver 220, which serves to drive the motor 230, may include an inverter (not shown) and an inverter controller (not shown). In addition, the driver 220 may further include a converter or the like for supplying a direct current (DC) power input to the inverter (not shown).

For example, when the inverter controller (not shown) outputs a switching control signal in a pulse width modulation (PWM) scheme to the inverter (not shown), the inverter (not shown) may perform a high-speed switching operation to supply an alternating current (AC) power at a predetermined frequency to the motor 230.

The main controller 210 may sense a laundry amount based on a current io detected by the current detector 225 or a position signal H sensed by the position sensor 235. For example, while the washing tub 120 rotates, the laundry amount may be sensed based on the current value io of the motor 230.

The main controller 210 may sense an amount of eccentricity of the washing tub 120, that is, an unbalance (UB) of the washing tub 120. The sensing of the amount of eccentricity may be performed based on a ripple component of the current io detected by the current detector 225 or an amount of change in rotational speed of the washing tub 120.

Meanwhile, a water level sensor 121 may measure a water level in the washing tub 120.

For example, a water level frequency at a zero water level with no water in the washing tub 120 may be 28 KHz, and a frequency at a full water level at which water reaches an allowable water level in the washing tub 120 may be 23 KHz.

That is, the frequency of the water level detected by the water level sensor 121 may be inversely proportional to the water level in the washing tub.

The water level Shg in the washing tub output from the water level sensor 121 may be a water level frequency or a water level that is inversely proportional to the water level frequency.

Meanwhile, the main controller 210 may determine whether the washing tub 120 is at a full water level, a zero water level, or a reset water level, based on the water level Shg in the washing tub detected by the water level sensor 121.

Figure 4:
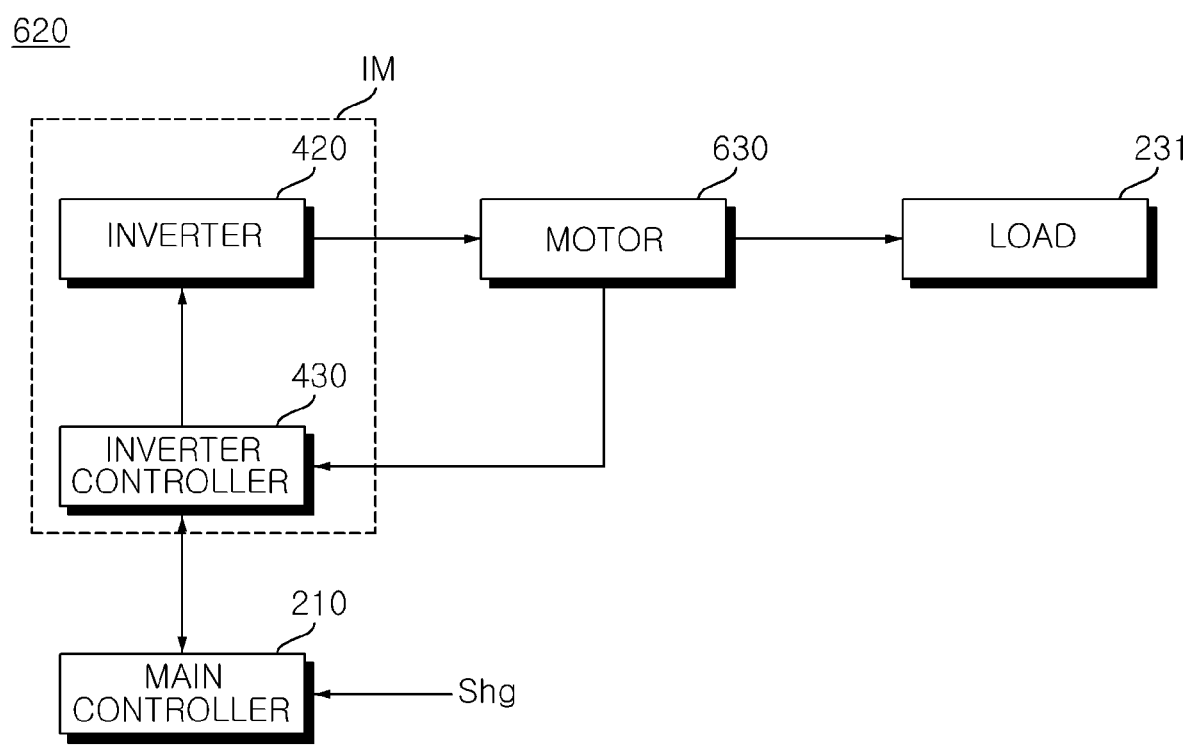
FIG. 4 illustrates an example of an internal block diagram of a drain pump driving apparatus of FIG. 1.
Figure 5:
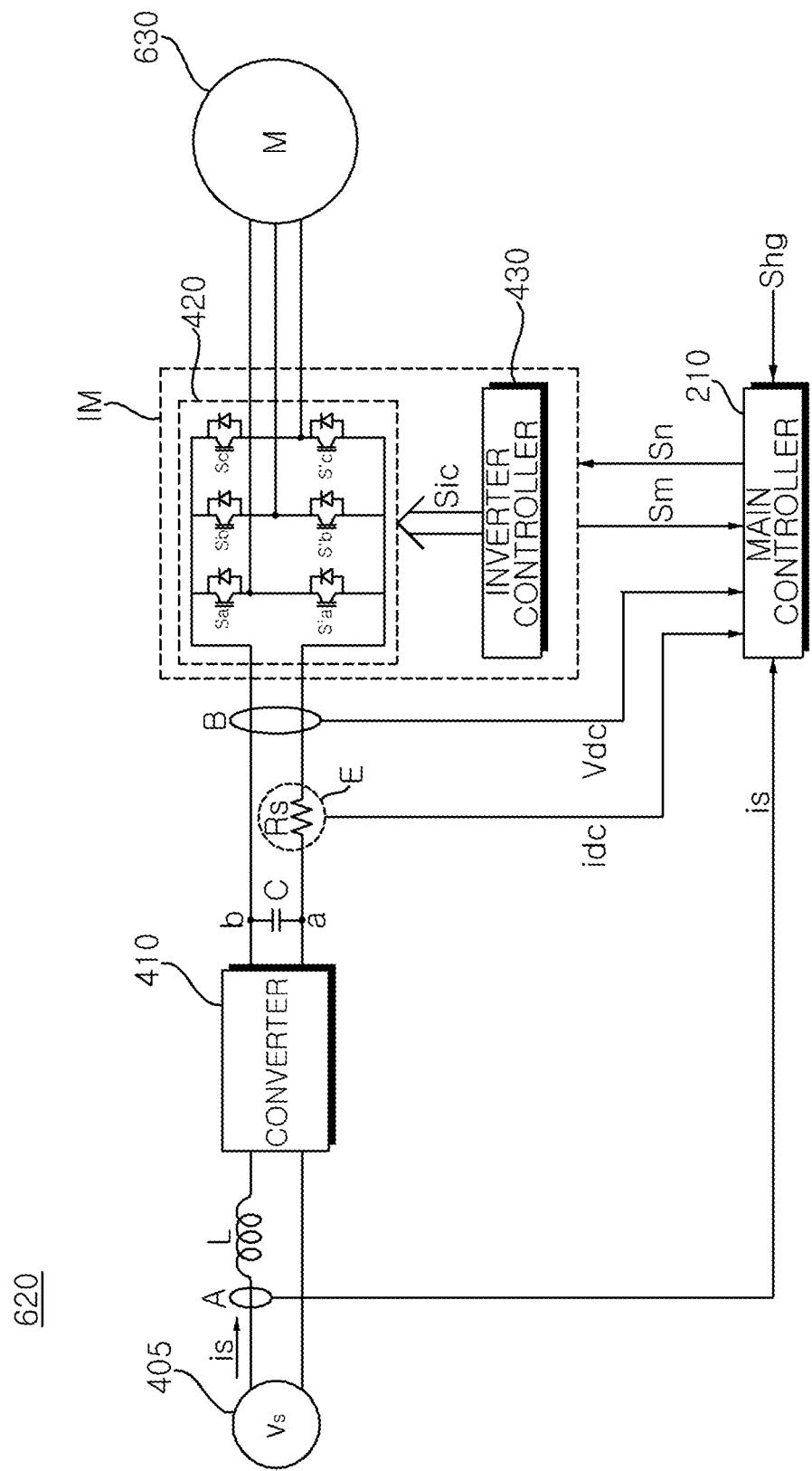
FIG. 5 illustrates an example of an internal circuit diagram of the drain pump driving apparatus of FIG. 4.

FIG. 4 illustrates an example of an internal block diagram of the drain pump driving apparatus of FIG. 1, and FIG. 5 illustrates an example of an internal circuit diagram of the drain pump driving apparatus of FIG. 4.

Referring to FIGS. 4 and 5, the drain pump driving apparatus 620 according to an embodiment of the present disclosure serves to drive the motor 630 in a sensorless manner, and may include an inverter 420, an inverter controller 430, and a main controller 210.

The main controller 210 and the inverter controller 430 may correspond to a controller and a second controller described in this specification, respectively.

The drain pump driving apparatus 620 according to an embodiment of the present disclosure may include a converter 410, a DC terminal voltage detector B, a DC terminal capacitor C, and an output current detector E. In addition, the drain pump driving apparatus 620 may further include an input current detector A and a reactor L.

Hereinafter, an operation of each constituent unit in the drain pump driving apparatus 620 of FIGS. 4 and 5 will be described.

The reactor L is disposed between a commercial AC power source 405 (vs) and the converter 410, and performs a power factor correction operation or a boost operation. In addition, the reactor L may also function to limit a harmonic current resulting from high-speed switching of the converter 410.

The input current detector A may detect an input current is input from the commercial AC power source 405. To this end, a current transformer (CT), a shunt resistor, or the like may be used as the input current detector A. The detected input current is may be input to the inverter controller 430 or the main controller 210 as a discrete signal in the form of a pulse. In FIG. 5, it is illustrated that the detected input current is input to the main controller 210.

The converter 410 converts the commercial AC power source 405 having passed through the reactor L into a DC power and outputs the DC power. Although the commercial AC power source 405 is shown as a single-phase AC power source in FIG. 5, it may be a 3-phase AC power source. The converter 410 has an internal structure that varies depending on the type of commercial AC power source 405.

Meanwhile, the converter 410 may be configured with diodes or the like without a switching device, and may perform a rectification operation without a separate switching operation.

For example, in case of the single-phase AC power source, four diodes may be used in the form of a bridge. In case of the 3-phase AC power source, six diodes may be used in the form of a bridge.

As the converter 410, for example, a half-bridge type converter having two switching devices and four diodes connected to each other may be used. In case of the 3-phase AC power source, six switching devices and six diodes may be used for the converter.

When the converter 410 has a switching device, a boost operation, a power factor correction, and a DC power conversion may be performed by the switching operation of the switching device.

Meanwhile, the converter 410 may include a switched mode power supply (SMPS) having a switching device and a transformer.

The converter 410 may convert a level of an input DC power and output the converted DC power.

The DC terminal capacitor C smooths the input power and stores the smoothed power. In FIG. 5, one element is exemplified as the DC terminal capacitor C, but a plurality of elements may be provided to secure element stability.

While it is illustrated in FIG. 5 that the DC terminal capacitor C is connected to an output terminal of the converter 410, embodiments of the present disclosure are not limited thereto. The DC power may be input directly to the DC terminal capacitor C.

For example, a DC power from a solar cell may be input directly to the DC terminal capacitor C or may be DC-to-DC converted and input to the DC terminal capacitor C. Hereinafter, what is illustrated in FIG. 5 will be mainly described.

Both ends of the DC terminal capacitor C may be referred to as DC terminals or DC link terminals because the DC power is stored therein.

The DC terminal voltage detector B may detect a voltage Vdc between the DC terminals, which are both ends of the DC terminal capacitor C. To this end, the DC terminal voltage detector B may include a resistance element and an amplifier. The detected DC terminal voltage Vdc may be input to the inverter controller 430 or the main controller 210 as a discrete signal in the form of a pulse. In FIG. 5, it is illustrated that the detected DC terminal voltage Vdc is input to the main controller 210.

The inverter 420 may include a plurality of inverter switching devices. The inverter 420 may convert the smoothed DC power Vdc into an AC power by an on/off operation of the switching device, and output the AC power to the synchronous motor 630.

For example, when the synchronous motor 630 is in a 3-phase type, the inverter 420 may convert the DC power Vdc into 3-phase AC powers va, vb and vc and output the 3-phase AC powers to the three-phase synchronous motor 630 as shown in FIG. 5.

As another example, when the synchronous motor 630 is in a single-phase type, the inverter 420 may convert the DC power Vdc into a single-phase AC power and output the single-phase AC power to a single-phase synchronous motor 630.

The inverter 420 includes upper switching devices Sa, Sb and Sc and lower switching devices S'a, S'b and S'c. Each of the upper switching devices Sa, Sb and Sc that are connected to one another in series and a respective one of the lower switching devices S'a, S'b and S'c that are connected to one another in series form a pair. Three pairs of upper and lower switching devices Sa and S'a, Sb and S'b, and Sc and S'c are connected to each other in parallel. Each of the switching devices Sa, S'a, Sb, S'b, Sc and S'c is connected with a diode in anti-parallel.

Each of the switching devices in the inverter 420 is turned on/off based on an inverter switching control signal Sic from the inverter controller 430. Thereby, an AC power having a predetermined frequency is output to the synchronous motor 630.

The inverter controller 430 may output the switching control signal Sic to the inverter 420.

In particular, the inverter controller 430 may output the switching control signal Sic to the inverter 420, based on a voltage command value Sn input from the main controller 210.

The inverter controller 430 may output voltage information Sm of the motor 630 to the main controller 210, based on the voltage command value Sn or the switching control signal Sic.

The inverter 420 and the inverter controller 430 may be configured as one inverter module IM, as shown in FIG. 4 or 5.

The main controller 210 may control the switching operation of the inverter 420 in a sensorless manner.

To this end, the main controller 210 may receive an output current idc detected by the output current detector E and a DC terminal voltage Vdc detected by the DC terminal voltage detector B.

The main controller 210 may calculate a power based on the output current idc and the DC terminal voltage Vdc, and output a voltage command value Sn based on the calculated power.

In particular, the main controller 210 may perform power control to stably operate the drain motor 630 and output a voltage command value Sn based on the power control. Accordingly, the inverter controller 430 may output a switching control signal Sic corresponding to the voltage command value Sn based on the power control.

The output current detector E may detect an output current idc flowing in the 3-phase motor 630.

The output current detector E may be disposed between the DC terminal capacitor C and the inverter 420 to detect an output current idc flowing in the motor.

In particular, the output current detector E may include one shunt resistance element Rs.

The output current detector E may detect a phase current ia, ib or is which is the output current idc flowing in the motor 630, in a time-division manner, when the lower switching device of the inverter 420 is turned on, using the one shunt resistor element Rs.

The detected output current idc may be input to the inverter controller 430 or the main controller 210 as a discrete signal in the form of a pulse. In FIG. 5, it is illustrated that the detected output current idc is input to the main controller 210.

The 3-phase motor 630 includes a stator and a rotor. The rotor rotates when the AC power at a predetermined frequency for each phase is applied to a coil of the stator for each phase (phase a, b or c).

Such a motor 630 may include a brushless DC (BLDC) motor.

The motor 630 may include, for example, a surface-mounted permanent-magnet synchronous motor (SMPMSM), an interior permanent magnet synchronous motor (IPMSM), and a synchronous reluctance motor (SynRM). The SMPMSM and the IPMSM are permanent magnet synchronous motors (PMSM) employing permanent magnets, while the SynRM has no permanent magnet.

Figure 6:
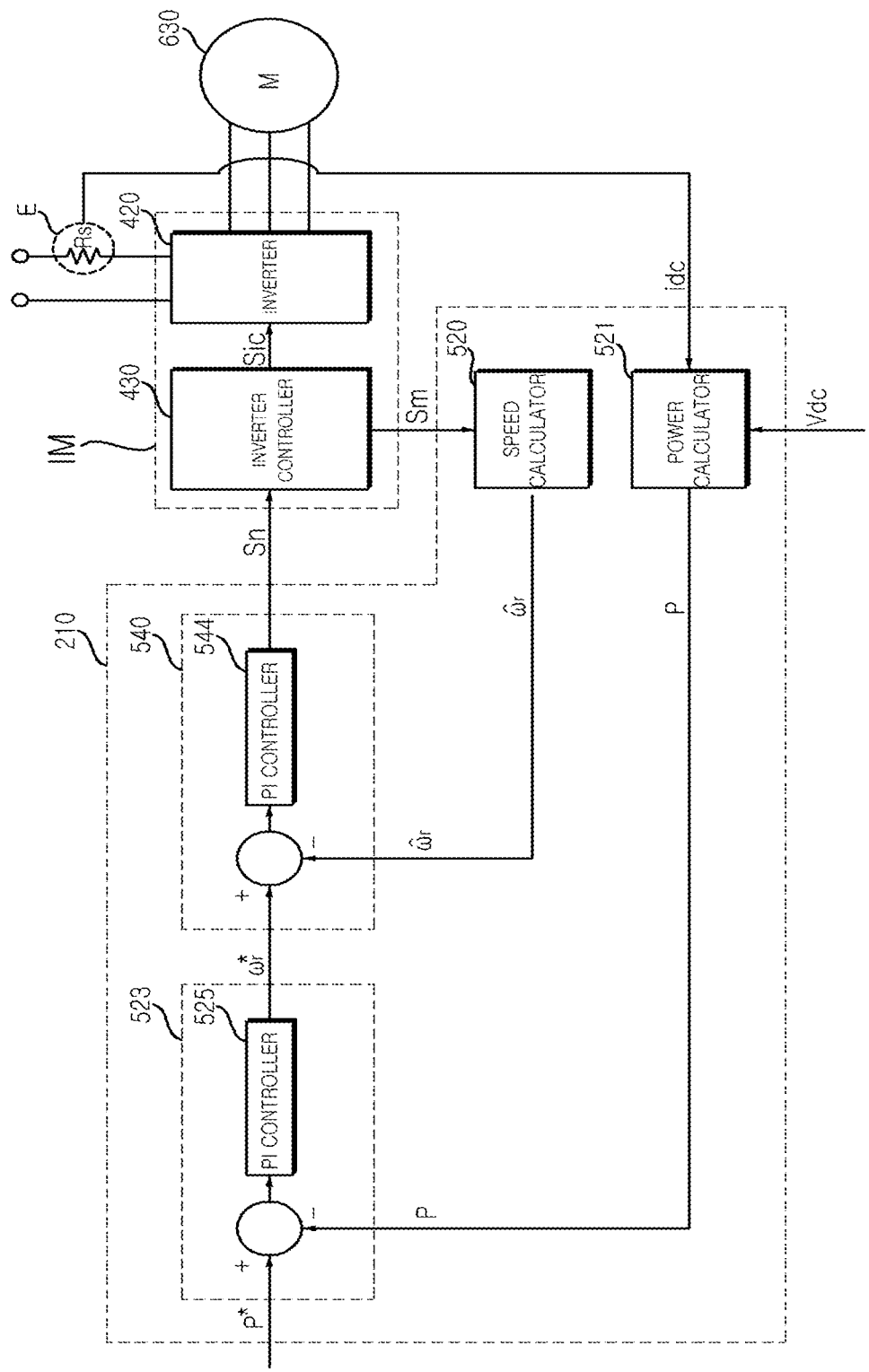
FIG. 6 is an internal block diagram of a main controller of FIG. 5.

FIG. 6 is an internal block diagram of the main controller of FIG. 5.

Referring to FIG. 6, the main controller 210 may include a speed calculator 520, a power calculator 521, a power controller 523, and a speed controller 540.

The speed calculator 520 may calculate a speed of the drain motor 630, based on the voltage information Sm of the motor 630 received from the inverter controller 430.

Specifically, the speed calculator 520 may calculate a zero crossing for the voltage information Sm of the motor 630 received from the inverter controller 430, and calculate a speed of the drain motor 630 based on the zero crossing.

The power calculator 521 may calculate a power P supplied to the motor 630, based on the output current idc detected by the output current detector E and the DC terminal voltage Vdc detected by the DC terminal voltage detector B.

The power controller 523 may generate a speed command value $\omega^*r$ based on the power P calculated by the power calculator 521 and a preset power command value $P^*r$.

For example, the power controller 523 may generate the speed command value ω*r, while a PI controller 525 performs PI control, based on a difference between the calculated power P and the power command value P*r.

Meanwhile, the speed controller 540 may generate a voltage command value Sn, based on the speed calculated by the speed calculator 520 and the speed command value ω*r generated by the power controller 523.

Specifically, the speed controller 540 may generate the voltage command value Sn, while a PI controller 544 performs PI control, based on a difference between the calculated speed and the speed command value ω*r.

The generated voltage command value Sn may be output to the inverter controller 430.

The inverter controller 430 may receive the voltage command value Sn from the main controller 210, and generate and output an inverter switching control signal Sic in the PWM scheme.

The output inverter switching control signal Sic may be converted into a gate drive signal in a gate driver (not shown), and the converted gate drive signal may be input to a gate of each switching device in the inverter 420. Thus, each of the switching devices Sa, S'a, Sb, S'b, Sc and S'c in the inverter 420 performs a switching operation. Accordingly, the power control can be performed stably.

Meanwhile, the main controller 210 according to an embodiment of the present disclosure may control the motor 630, during drainage, based on the output current idc and the DC terminal voltage Vdc to be driven with a first power when a lift is at a first level and to drive the motor with the first power when the lift is at a second level that is greater than the first level, wherein the lift is a difference between a water level of a water introduction part through which water flows into the drain pump 141 and a water level of a water discharge part through which the water is discharged out of the drain pump 141. Accordingly, water pumping can be performed smoothly even if the lift is changed during the drainage.

In particular, since the power control is performed to drive the motor 630 with a constant power, the converter 410 merely needs to supply the constant power. Thus, the stability of the converter can be improved.

When the power supplied to the motor 630 reaches the first power, the main controller 210 according to an embodiment of the present disclosure may control a speed of the motor 630 to be constant. Since the power control is performed as described above, it is possible to minimize a decrease in drainage performance according to installation conditions.

When the main controller 210 according to an embodiment of the present disclosure controls the speed of the motor 630 to be increased, a period during which the speed of the motor 630 is increased may include an initial rise section and a second rise section where the increase in the speed of the motor is less than the increase in the speed of the motor in the initial rise section. Particularly, the main controller 210 may control the output current idc to be constant in the second rise section. Accordingly, the motor 630 can be operated with a constant power.

The main controller 210 according to an embodiment of the present disclosure may control the speed of the motor 630, during the drainage, to be increased as a level of the lift increases.

The main controller 210 according to an embodiment of the present disclosure may control an amount of water pumped by an operation of the drain pump 141, during the drainage, to be decreased as the level of the lift increases.

The main controller 210 according to an embodiment of the present disclosure may control the speed of the motor 630, during the drainage, to be increased as the water level in the washing tub 120 decreases.

The main controller 210 according to an embodiment of the present disclosure may control the decrease in the amount of water pumped by the operation of the drain pump 141 according to the increase in the level of the lift to be smaller when the power control is performed with respect to the motor 630 than when speed control is performed with respect to the motor 630. Accordingly, when compared to the speed control, the power control makes it possible to set a greater range of lift levels, thereby increasing a freedom of installation.

The main controller 210 according to an embodiment of the present disclosure may control the power supplied to the motor 630, during the drainage, to be constant without decreasing over time. Accordingly, a drainage time can be shortened.

The main controller 210 according to an embodiment of the present disclosure may control the motor 630 such that the power control is performed when the drainage is started and the power control is terminated when a residual water level is reached. Accordingly, the drainage operation can be efficiently performed.

The main controller 210 according to an embodiment of the present disclosure may control the voltage command value Sn and a duty of the switching control signal Sic to be greater as the output current idc is at a smaller level. Accordingly, the motor 630 can be driven with a constant power.

The drain motor 630 according to an embodiment of the present disclosure may be implemented as a brushless DC motor 630. Accordingly, the power control, rather than constant-speed control, can be implemented in a simple manner.

Meanwhile, the main controller 210 according to another embodiment of the present disclosure may control the speed of the motor 630, during the drainage, to be increased when the power supplied to the motor 630 does not reach the first power and to be decreased when the power supplied to the motor 630 exceeds the first power. Accordingly, since the power control is performed to drive the motor 630 with a constant power, the converter 410 merely needs to supply the constant power. Thus, the stability of the converter can be improved. In addition, since the power control is performed, it is possible to minimize a decrease in drainage performance according to installation conditions.

The main controller 210 according to further another embodiment of the present disclosure may control the speed of the motor 630 to be constant, when the power supplied to the motor 630 reaches the first power. Since the power control is performed as described above, it is possible to minimize a decrease in drainage performance according to installation conditions.

The main controller 210 according to further another embodiment of the present disclosure may control the speed of the motor 630, during drainage, to be increased as the level of the lift increases, wherein the lift is a difference between a water level of the water introduction part through which water flows into the drain pump 141 and a water level of the water discharge part through which the water is discharged out of the drain pump 141. Accordingly, water pumping can be performed smoothly even if the lift is changed during the drainage. In particular, since the power control is performed, it is possible to minimize a decrease in drainage performance according to installation conditions.

The main controller 210 according to further another embodiment of the present disclosure may control the speed of the motor 630, during the drainage, to be increased as the water level in the washing tub 120 decreases. Accordingly, water pumping can be performed smoothly even if the water level in the washing tub 120 decreases during the drainage.

Figure 7A:
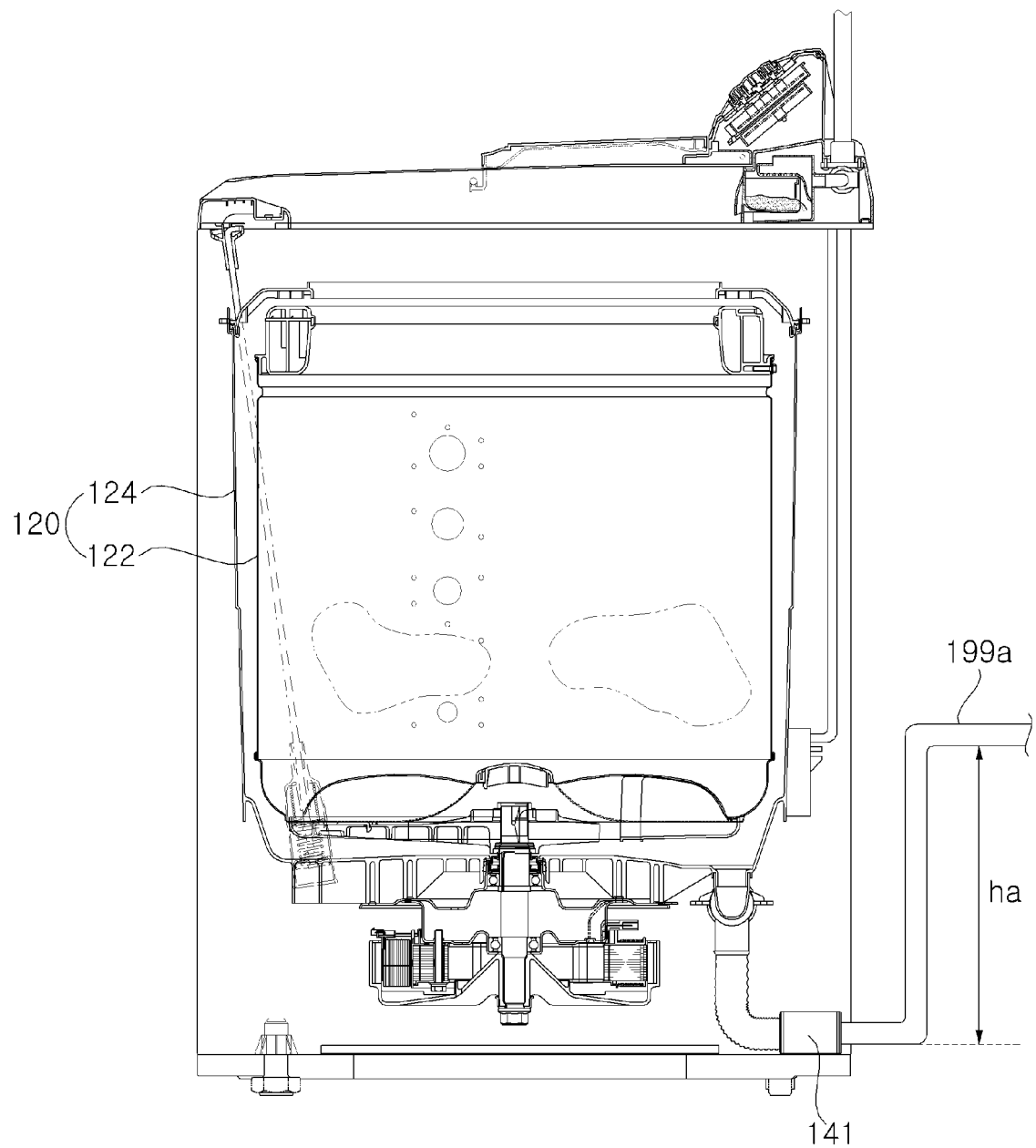
FIGS. 7A and 7B are views illustrating various examples of a drain pipe connected to a drain pump in the laundry treatment machine of FIG. 1.
Figure 7B:
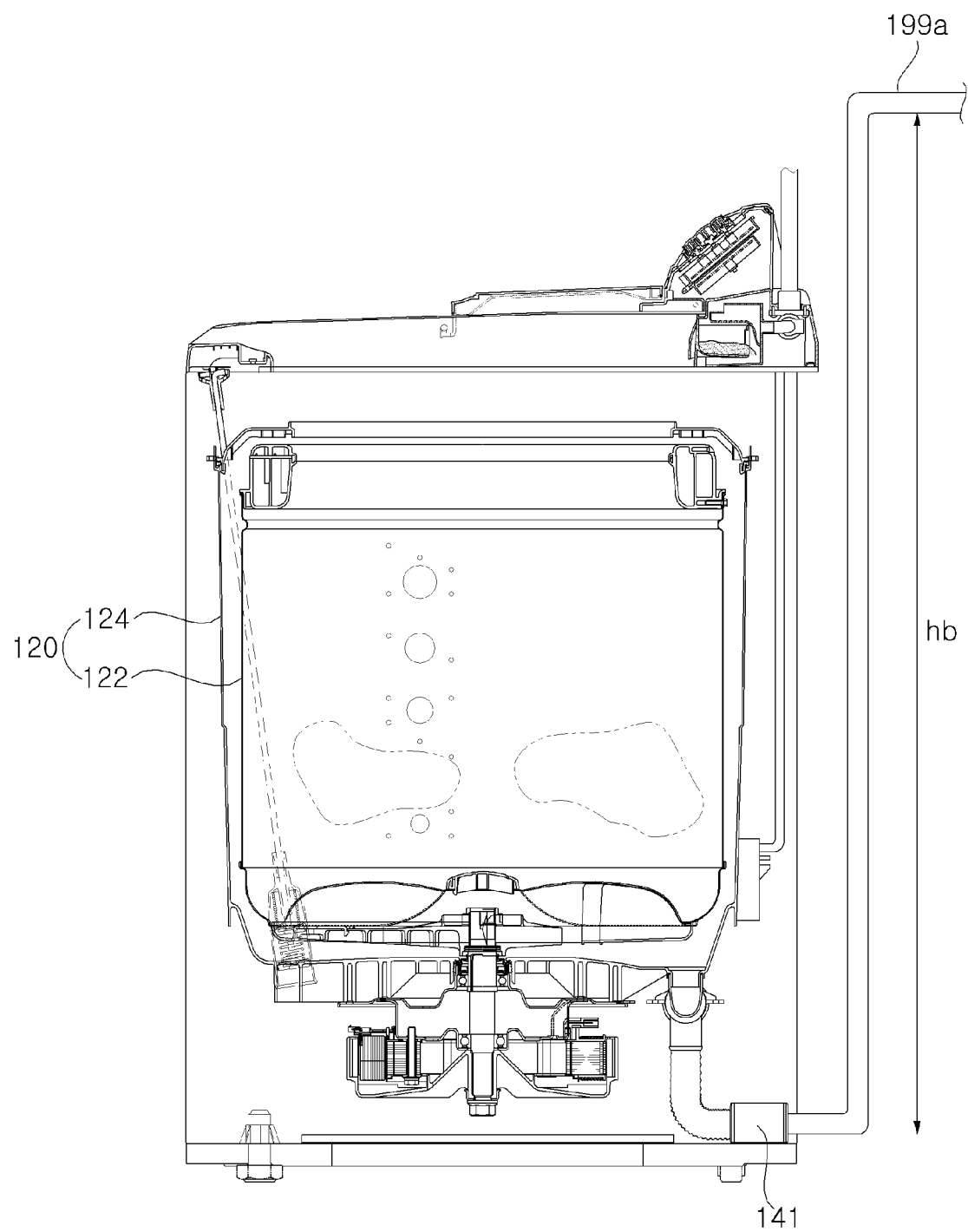

FIGS. 7A and 7B are views illustrating various examples of a drain pipe connected to the drain pump of the laundry treatment machine of FIG. 1.

FIG. 7A illustrates that a difference in height between the drain pump 141 and the drain pipe 199a is ha. FIG. 7B illustrates that a difference in height between the drain pump 141 and the drain pipe 199a is hb that is greater than ha.

That is, FIG. 7A illustrates that the level of the lift is ha, wherein the lift is a difference between a water level of the water introduction part through which water flows into the drain pump 141 and a water level of the water discharge part through which the water is discharged out of the drain pump 141, and FIG. 7B illustrates that the level of the lift is hb that is much greater than ha.

For example, ha may be about 0.5 m and hb may be about 3 m.

When the laundry treatment machine 100 is installed in a basement, the drain pipe 199a should extend to the ground for drainage. Therefore, as shown in FIGS. 7A and 7B, the drain pipe 199a should extend to a position that is higher than that of the drain pump 141.

In this case, if the drain pump is implemented in a solenoid type, the drainage will not be performed smoothly due to the low pumping power.

Accordingly, a motor is preferably used to drive the drain pump. Conventionally, an AC motor has been employed and driven at a constant speed of about 3000 rpm or 3600 rpm using an AC power of 50 Hz or 60 Hz.

In this case, since the motor is driven at a constant speed irrespective of the height of the drain pump, noise is generated by movement of residual water remaining in the drain pipe 199a.

In order to solve this problem, the motor 630 capable of changing its speed is used in the present disclosure.

In particular, the brushless DC (BLDC) motor 630 is used as the motor 630 for driving the drain pump 141 according to an embodiment of the present disclosure.

The use of the BLDC motor 630 is advantageous in that the speed can be changed. Based thereon, the present disclosure proposes a way to smoothly perform water pumping even if the lift is changed during drainage.

Further, the present disclosure proposes a way to stably drive the converter even if the lift is changed during drainage.

In addition, the present disclosure proposes a way to minimize a decrease in drainage performance according to installation conditions. This will be described with reference to FIG. 9 and other drawings.

Figure 8A:
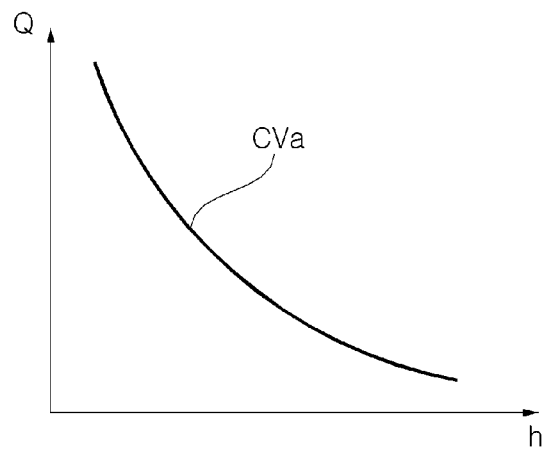
FIGS. 8A to 8C is a graph illustrating relationships of a lift with a water-pumped amount, an output power and an input power.
Figure 8B:
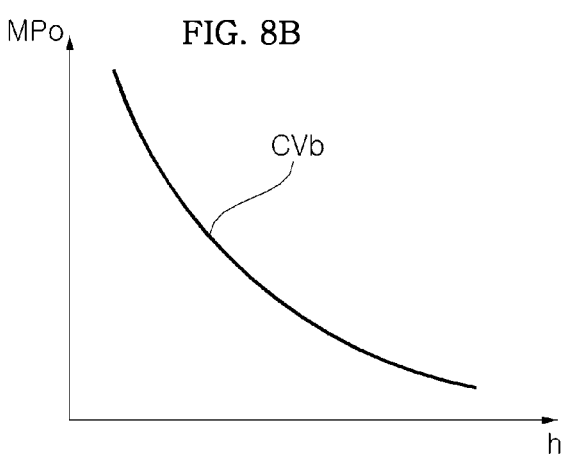
Figure 8C:
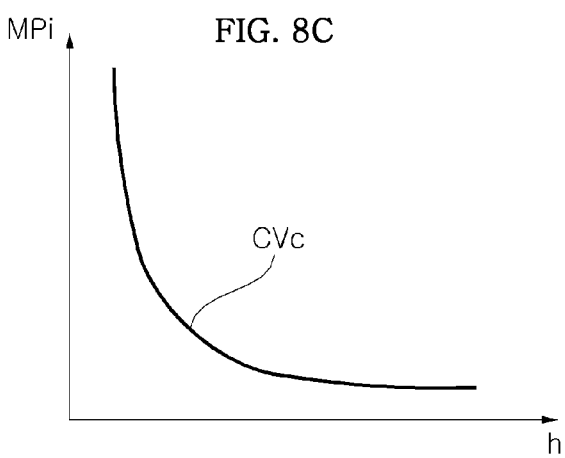

FIG. 8 is a graph illustrating a relationship of the lift with the water-pumped amount, the output power, or the input power.

Referring to (a) of FIG. 8, as the level of the lift increases, that is, from ha in FIG. 7A toward hb in FIG. 7B, the water-pumped amount Q may decrease.

Alternatively, as the level of the lift decreases, that is, from hb in FIG. 7B toward ha in FIG. 7A, the water-pumped amount Q may increase.

For example, when the drain motor 630 is controlled to be driven at a constant speed of 3600 rpm, the water-pumped amount is larger as the level of the lift is from hb toward ha, and accordingly, the output power consumed by the pump motor 630 increases.

Accordingly, the power supplied to the pump motor 630 also needs to increase as the level of the lift is from hb toward ha.

That is, as shown in (b) of FIG. 8, as the level of the lift increases, that is, from ha in FIG. 7A toward hb in FIG. 7B, the output power MPo decreases, and as the level of the lift decreases, that is, from hb in FIG. 7B toward ha in FIG. 7A, the output power MPo increases.

In addition, as shown in (c) of FIG. 8, as the level of the lift increases, that is, from ha in FIG. 7A toward hb in FIG. 7B, the power MPi supplied to the pump motor 630 decreases, and as the level of the lift decreases, that is, from hb in FIG. 7B toward ha in FIG. 7A, the power MPi supplied to the pump motor 630 increases.

In a case where the output power MPo or the power MPi supplied to the pump motor 630 varies according to the change in the level of the lift, it is required that the converter 410 supplying a DC power be of high performance. In particular, it is required that the smaller the level of the lift, the greater the power supplied.

However, in order to design the converter 410 having a power that is variable depending on the level of the lift, high expenses are incurred or complicated control is required.

Thus, the present disclosure proposes a way of driving the motor 630 based on the power control for making the power supplied to the pump motor 630 or the output power depending on the level of the lift constant. Based thereon, the converter merely needs to supply the constant power, thereby improving the stability of the converter. This will be described with reference to FIG. 9 and other drawings.

Figure 9:
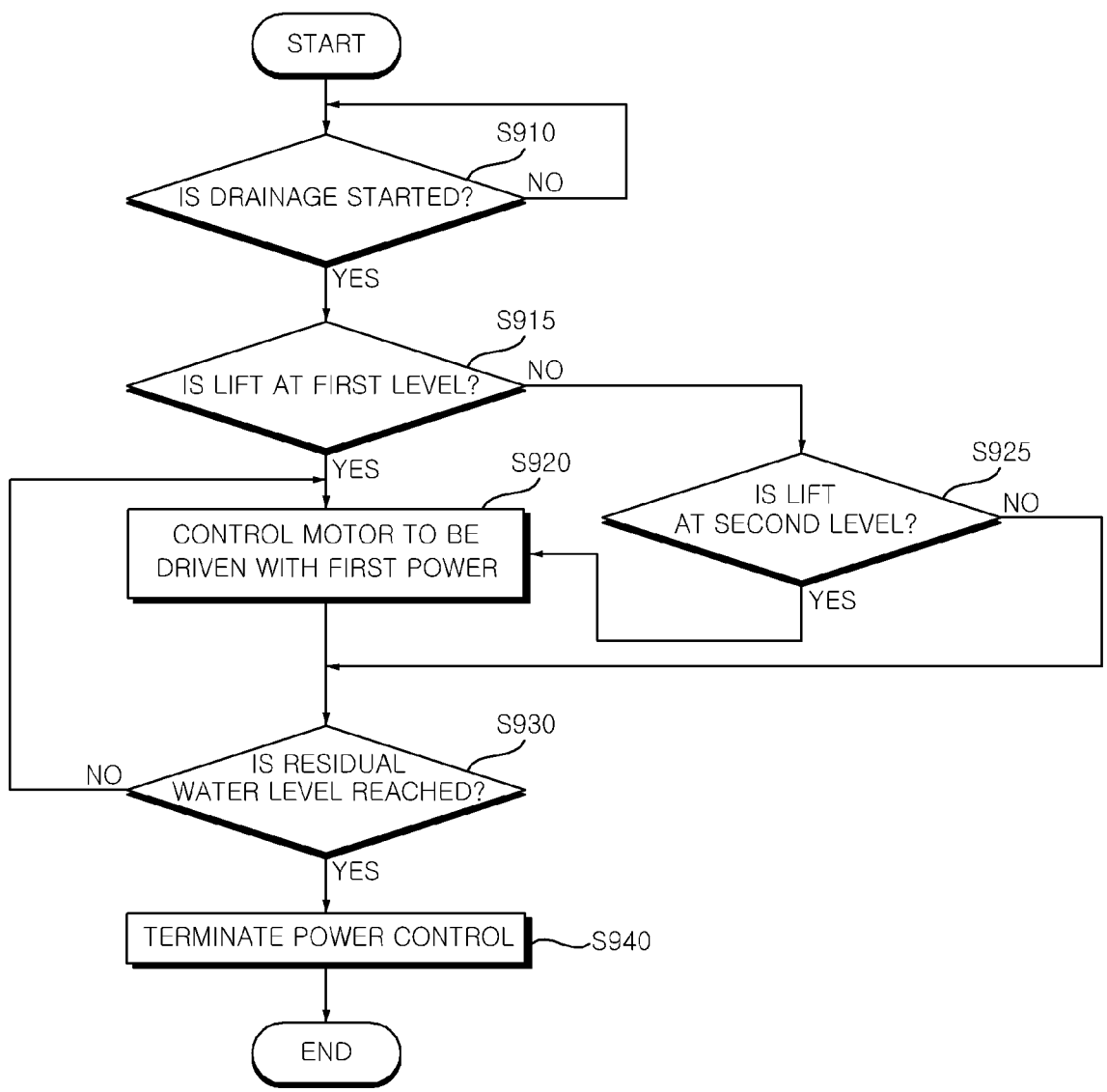
FIG. 9 is a flowchart showing an example of a method of operating the drain pump driving apparatus according to an embodiment of the present disclosure.

FIG. 9 is a flowchart showing an example of a method of operating the drain pump driving apparatus according to an embodiment of the present disclosure, and FIGS. 10 to 13 are reference views for explaining the operation method of FIG. 9.

Referring to FIG. 9, the main controller 210 of the drain pump driving apparatus determines whether to start drainage (S910).

The drainage may be performed in each of the washing, rinsing and dewatering processes.

For example, the drainage may be performed at the end of the washing process, at the end of the rinsing process, and at the end of initial dewatering in the dewatering process.

When the drainage is started, the main controller 210 may control the drain motor 630 to be operated.

Meanwhile, the main controller 210 may determine whether the lift is at a first level (S915), wherein the lift is a difference between a water level of the water introduction part through which water flows into the drain pump 141 and a water level of the water discharge part through which the water is discharged out of the drain pump 141.

For example, the main controller 210 may estimate the lift based on a speed of the drain motor 630 during the drainage.

Specifically, during the drainage, the main controller 210 may calculate the lift as being higher as the speed of the drain motor 630 is higher.

Accordingly, when the speed of the drain motor 630 during the drainage is a first speed, the main controller 210 may calculate the level of the lift as the first level. Here, the first level may correspond to ha in FIG. 7A.

On the other hand, when the speed of the drain motor 630 during the drainage is a second speed that is higher than the first speed, the main controller 210 may calculate the level of the lift as a second level that is greater than the first level. Here, the second level may correspond to hb in FIG. 7B.

The first level may correspond to a minimum level of the lift, and the second level may correspond to a maximum level of the lift.

When the lift is at the first level, the main controller 210 may perform power control to drive the motor with a first power (S920).

When the lift is not at the first level, the main controller 210 may determine whether the lift is at the second level (S925). If the lift is at the second level, the main controller 210 may perform power control to drive the motor with the first power (S920).

That is, the main controller 210 may be configured to drive the motor, during the drainage, with the first power constantly irrespective of the level of the lift. This may be referred to as power control.

That is, the main controller 210 may be configured to drive the motor, during the drainage, with the first power constantly even if the level of the lift is changed. Accordingly, water pumping can be performed smoothly even if the lift is changed during the drainage.

Since the power control is performed to drive the motor with a constant power, the converter 410 merely needs to supply the constant power. Thus, the stability of the converter 410 can be improved.

In addition, the drain motor 630 can be driven stably, and furthermore, the drainage time can be shortened.

Next, the main controller 210 may determine whether the drainage is completed and the water level in the washing tub 120 reaches a residual water level (S930). If yes, the main controller 210 may terminate the power control (S940) and terminate the driving of the motor 630. Accordingly, the drainage operation can be efficiently performed.

Here, it may be determined whether the water level in the washing tub 120 reaches the residual water level using a water level sensor (not shown), based on a frequency from the water level sensor.

Figure 10:
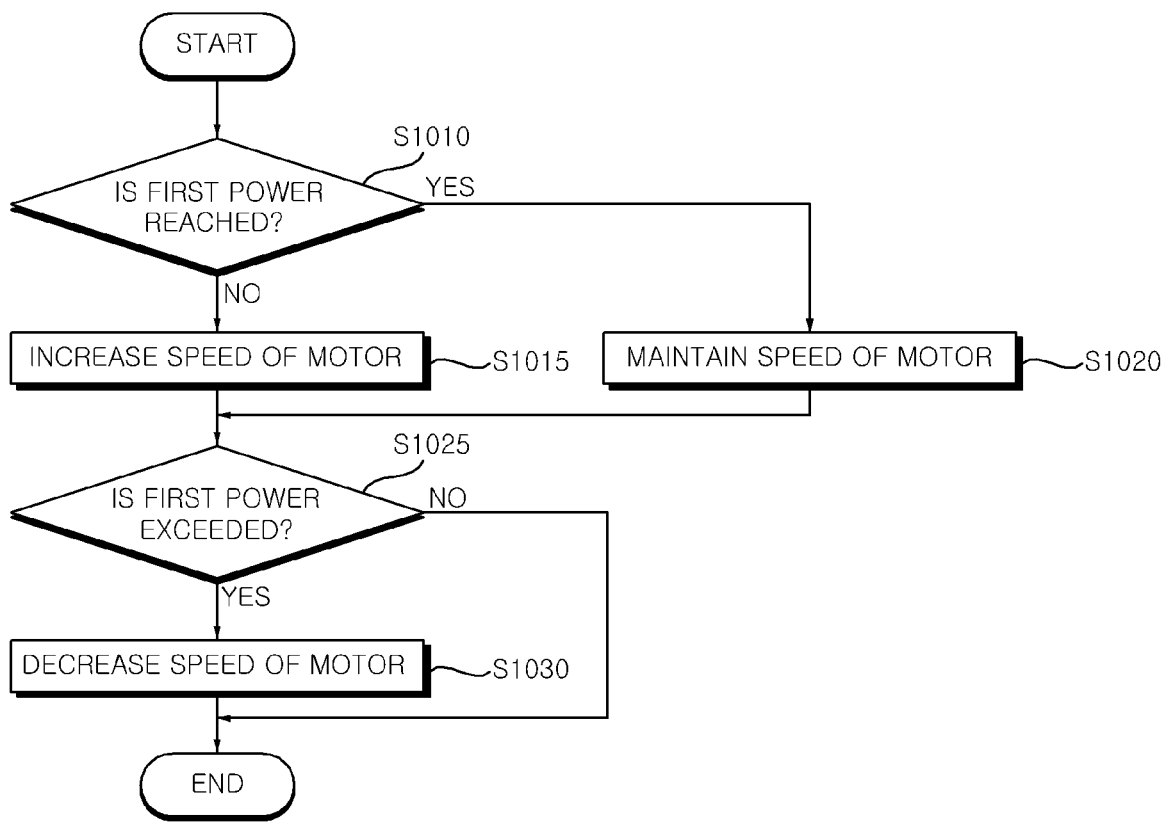
FIGS. 10 to 13 are reference views for explaining the operation method of FIG. 9.

FIG. 10 is a reference view for explaining detailed operations in step S920 of FIG. 9.

For the power control, the main controller 210 may determine, during the drainage, whether the first power, which is a target power, has been reached (S1010).

In particular, the main controller 210 may calculate a power supplied to the motor 630, based on the output current idc detected by the output current detector E and the DC terminal voltage Vdc detected by the DC terminal voltage detector B.

When the power supplied to the motor 630 does not reach the first power, the main controller 210 may control a speed of the motor 630 to be increased (S1015).

On the other hand, when the power supplied to the motor 630 has reached the first power, the main controller 210 may control the speed of the motor 630 to be maintained (S1020).

When the power supplied to the motor 630 exceeds the first power (S1025), the main controller 210 may control the speed of the motor 630 to be decreased (S1030).

Since the power control is performed as described above, it is possible to minimize a decrease in drainage performance according to installation conditions.

Figure 11:
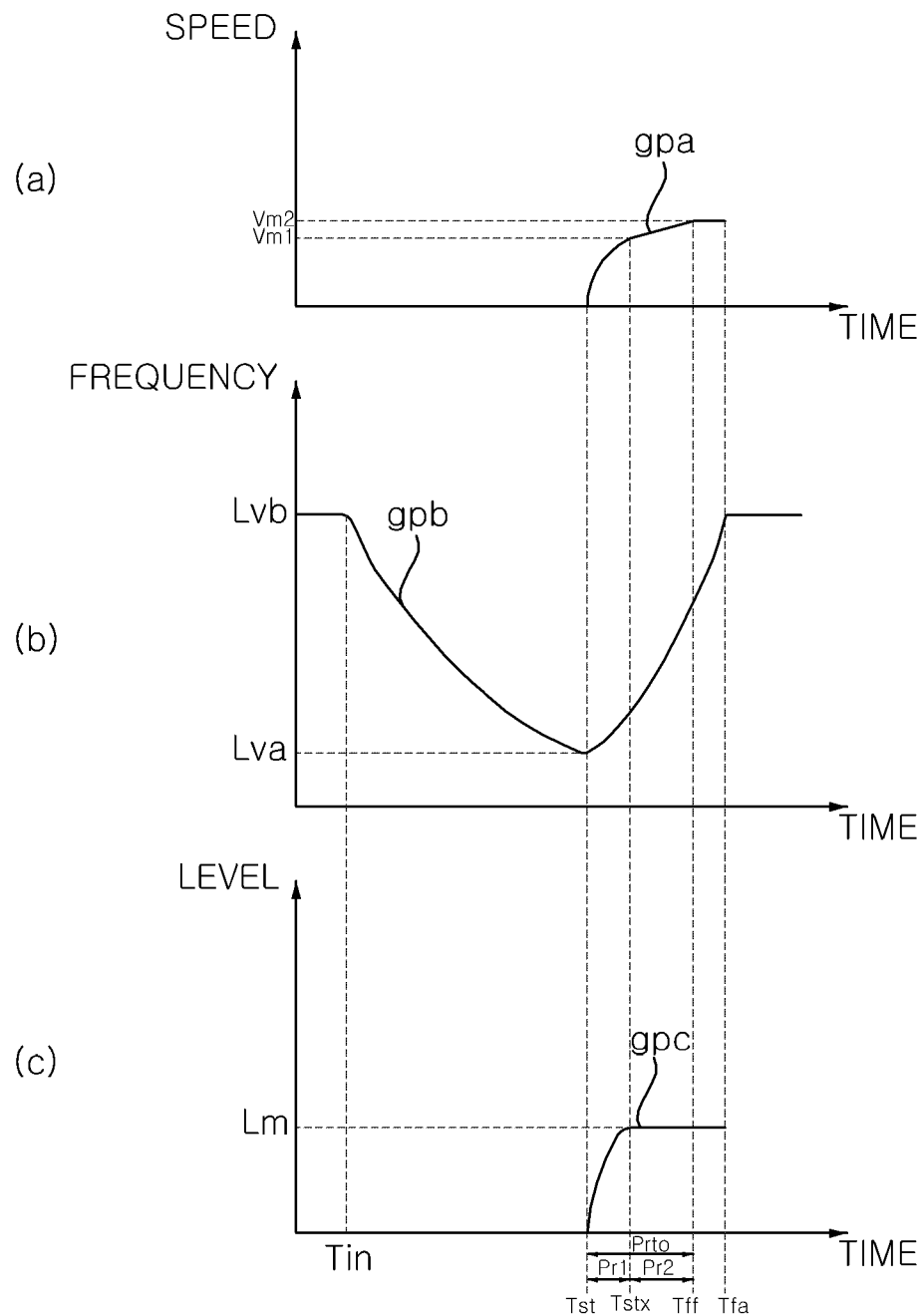

FIG. 11 is a reference view for explaining FIG. 10.

(a) of FIG. 11 illustrates a waveform gda of the speed of the drain motor 630, (b) of FIG. 11 illustrates a waveform gdb of the water level frequency sensed by the water level sensor 121 in the washing tub 120, and (c) of FIG. 11 illustrates a waveform gdc of the output current flowing in the drain motor 630.

Initially, the washing tub 120 is at a zero water level and may have a water level frequency of Lvb.

At time point Tin, water may be introduced into the washing tub 120, and the water level frequency may be gradually lowered. At time point Tst, the washing tub 120 may have the lowest water level frequency of Lva.

When drainage is started at time point Tst, power control is performed with respect to the drain motor 630, and accordingly, the speed of the drain motor 630 may be increased as shown in (a) of FIG. 11.

As described above, when the power supplied to the drain motor 630 does not reach the first power, the speed of the drain motor 630 may be continuously increased.

Meanwhile, the main controller 210 may control a period Prsto of increase in the speed of the motor to include an initial rise section Pr1 and a second rise section Pr2 where the increase in the speed of the motor is less than the increase in the speed of the motor in the initial rise section Pr1.

The initial rise section Pr1 is a section in which the speed of the motor 630 is sharply rises, and accordingly, the output current idc flowing in the drain motor 630 also sharply increases as shown in (c) of FIG. 11.

The initial rise section Pr1 may correspond to a section for open loop control, rather than closed loop feedback control, of the drain motor 630.

When the speed of the motor 630 reaches Vm1, the main controller 210 may perform the closed loop feedback control, particularly performing the power control such that the power supplied to the drain motor 630 reaches the first power P1.

Accordingly, as shown in (a) of FIG. 11, the speed of the drain motor 630 may rise slowly in the second rise section Pr2, when compared to that in the initial rise section Pr1.

At this time, as shown in (c) of FIG. 11, the output current idc flowing in the drain motor 630 may be constant, based on the power control. Accordingly, the motor 630 can be operated with a constant power.

When the power supplied to the drain motor 630 reaches the first power P1, the main controller 210 may control the speed of the drain motor to be maintained as it is at that time.

(a) of FIG. 11 illustrates that the power supplied to the drain motor 630 has reached the first power P1 at time point Tff, and the speed of the drain motor 630 at that time is Vm2.

Thereafter, when the power supplied to the drain motor 630 is maintained as the first power, the speed of the drain motor 630 is maintained as Vm2.

In particular, the speed of the drain motor 630 may be maintained as Vm2 until time point Tfa when the power control is terminated.

When the drainage is started at time point Tst, the water level frequency may rise from Lva, up to time point Tfa, to LVb, which corresponds to the zero water level.

Referring to (c) of FIG. 11, the output current idc flowing in the drain motor 630 may be at a constant level Lm after time point Tstx when the power control is started until time point Tfa when the power control is terminated.

In this way, the main controller 210 may control the output current idc to be constant when the speed of the motor 630 is increased, particularly in the second rise section Pr2. Accordingly, the motor 630 can be operated with a constant power.

Meanwhile, the constant output current idc in (c) of FIG. 11 may mean that the current is within an allowable range based on level Lm. For example, when the current is pulsating within about 10% based on level Lm, the current may be regarded as constant.

Figure 12:
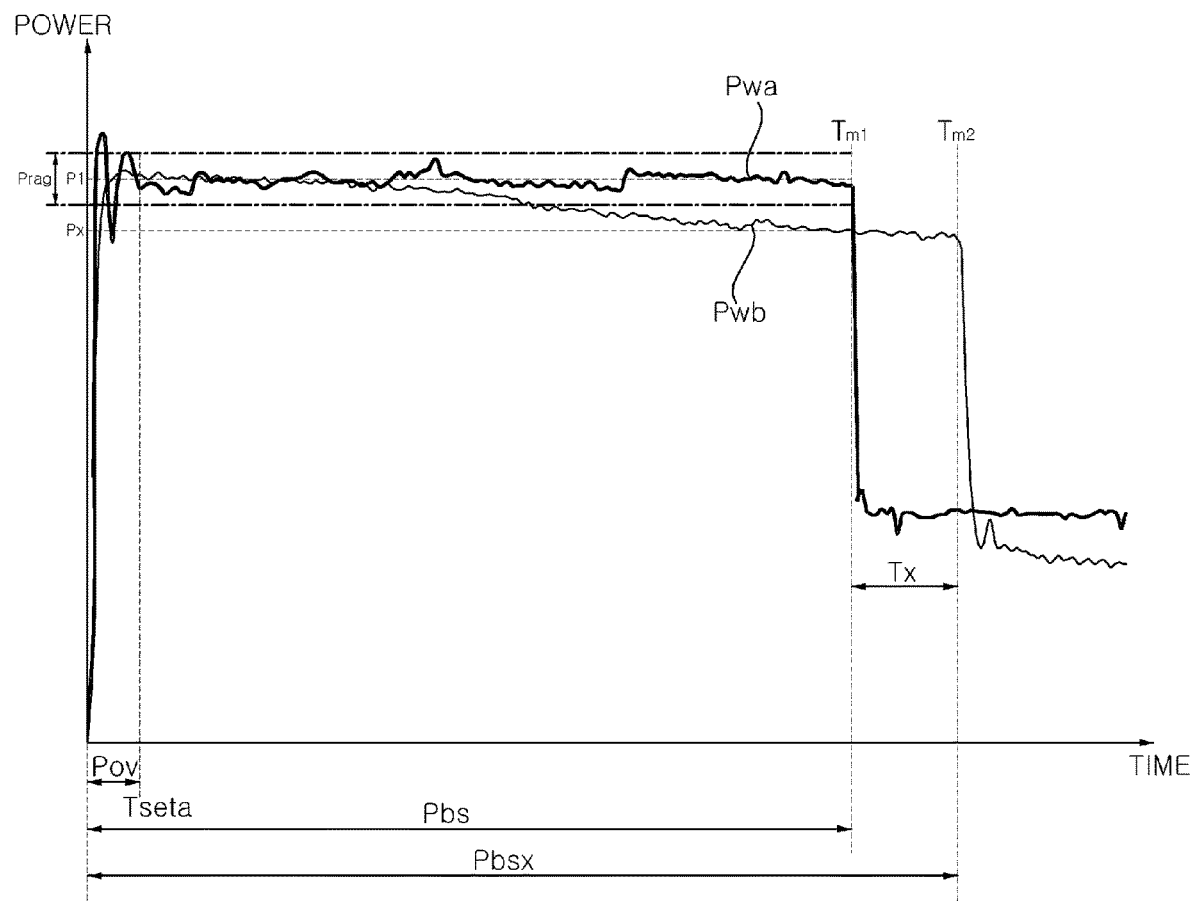

FIG. 12 is a view showing a power supplied to the motor when the power control or the speed control is performed.

When the power control is performed as in the embodiments of the present disclosure, a time-dependent waveform of the power supplied to the motor 630 may be exemplified as Pwa.

FIG. 12 illustrates that the power is maintained in a substantially constant manner until time point Tm1 by performing the power control, and the power control is terminated at time point Tm1.

By performing the power control, the main controller 210 may control the power supplied to the motor 630, during the drainage, to be constant without decreasing over time, although the water level in the washing tub 120 decreases.

By performing the power control, the main controller 210 may control the power supplied to the motor 630, during the drainage, to be the first power P1.

In particular, even if the lift is changed, the main controller 210 may control the power supplied to the motor 630, during the drainage, to be the constant first power P1, by performing the power control.

At this time, the constant first power P1 may mean that the motor 630 is driven with a power within a first allowable range Prag based on the first power P1. For example, the power within the first allowable range Prag may be a power pulsating within about 10% based on the first power P1.

In FIG. 12, it is illustrated that when the power control is performed, the motor 630 is driven with a power within the first allowable range Prag based on the first power P1 from time point Tseta until time point Tm1 when the drainage is completed, excluding an overshooting period Pov. Accordingly, water pumping can be smoothly performed even if the lift is changed during the drainage. In addition, the stability of the converter 410 can be improved.

Here, the first allowable range Prag may be greater as the first power P1 is at a higher level. In addition, the first allowable range Prag may be greater as a drainage completion period Pbs is longer.

That is, when the lift is at the first level, the main controller 210 may be configured to drive the motor 630 with a power within the first allowable range Prag based on the first power P1, without decreasing over time, from first time point Tseta after the drainage is started until time point Tm1 when the drainage is completed, and when the lift is at the second level, the main controller 210 may be configured to drive the motor 630 with a power within the first allowable range Prag based on the first power P1, without decreasing over time, from first time point Tseta until time point Tm1 when the drainage is completed.

To this end, when the power control is performed during the drainage, the main controller 210 may calculate a power based on the output current idc and the DC terminal voltage Vdc and output a voltage command value Sn based on the calculated power, and the inverter controller 430 may output a switching control signal Sic to the motor 630 based on the voltage command value Sn.

Meanwhile, the main controller 210 may control the voltage command value Sn and a duty of the switching control signal Sic to be greater as the output current idc is at a smaller level. Accordingly, the motor 630 can be driven with a constant power.

Meanwhile, the main controller 210 may control the speed of the motor 630 to be increased as the level of the lift increases. Accordingly, water pumping can be smoothly performed even if the lift is changed during the drainage. In particular, since the power control is performed, it is possible to minimize a decrease in drainage performance according to installation conditions.

Meanwhile, the main controller 210 may control the speed of the motor 630, during the drainage, to be increased as the water level in the washing tub 120 decreases. Accordingly, water pumping can be smoothly performed even if the water level in the washing tub 120 decreases during the drainage.

Unlike the embodiments of the present disclosure, when the speed control is performed, that is, when the speed of the drain motor 630 is controlled to be maintained constantly, a time-dependent waveform of the power supplied to the motor 630 may be exemplified as Pwb.

In FIG. 12, it is illustrated that the speed control is performed until time point Tm2, and the speed control is terminated at time point Tm2.

The waveform Pwb of the power based on the speed control indicates that the power supplied to the motor 630 may be gradually reduced, while the speed of the motor 630 is constant, as the water level in the washing tub decreases during the drainage.

In FIG. 12, it is illustrated that, during a speed control period Pbsx, the power supplied to the motor 630 is gradually reduced up to approximately Px at time point Tm2 when the drainage is completed.

Accordingly, the time when the operation of the motor 630 is terminated in a case where the speed control is performed is Tm2, which is delayed by approximately period Tx, when compared to that in a case where the power control is performed.

Consequently, according to the embodiments of the present disclosure, since the power control is performed during the drainage, the drainage time can be shortened by approximately period Tx, when compared to that in the case where the speed control is performed. In addition, the power supplied from the converter 410 can be kept constant, thereby improving the operation stability of the converter 410.

Figure 13:
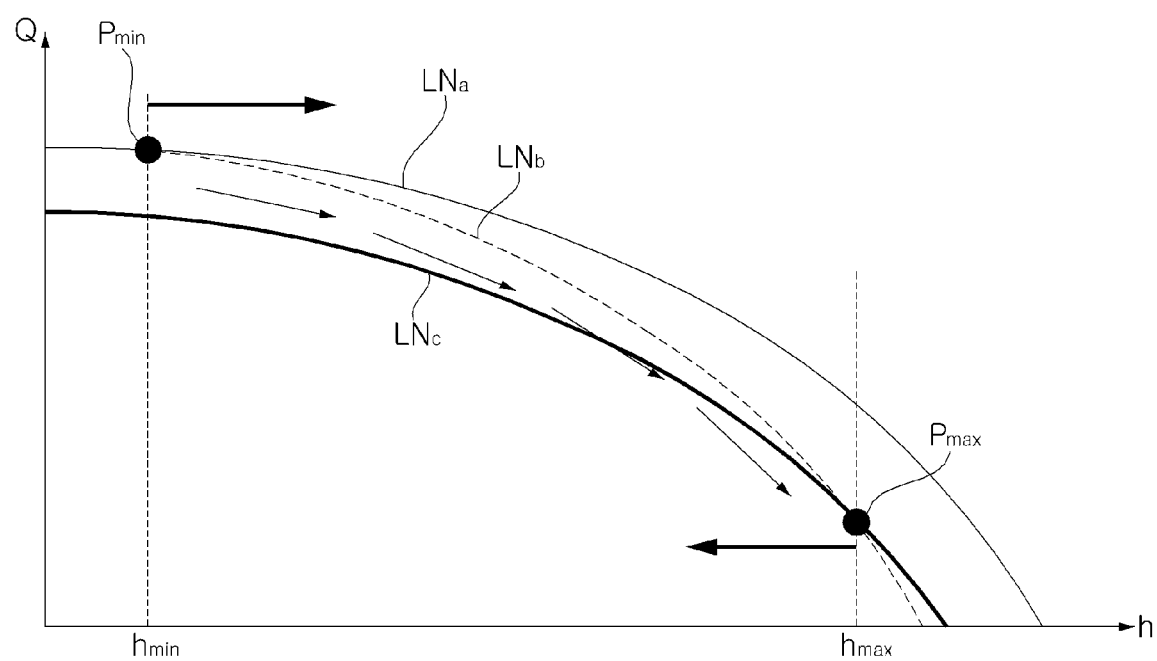

FIG. 13 is a view illustrating a relationship between the lift and the water-pumped amount.

Referring to FIG. 13, waveform LNa and waveform LNc are waveforms indicating the water-pumped amount with respect to the lift when the power control is performed, and waveform LNb is a waveform indicating the water-pumped amount with respect to the lift when the speed control is performed.

In particular, waveform LNa indicates that the power control is performed with a constant power that is greater than that indicated by waveform LNc.

According to FIG. 13, the main controller 210 may control a decrease in the amount of water pumped by the operation of the drain pump 141 as the level of the lift increases to be smaller when the power control is performed with respect to the motor 630 than when speed control is performed with respect to the motor 630.

Waveforms LNa to LNc commonly indicate that the water-pumped amount decreases from minimum level Hmin of the lift toward maximum level Hmax of the lift, that is, as the level of the lift increases.

However, the decrease in the amount of water pumped by the operation of the drain pump 141 as the level of the lift increases is smaller when the power control is performed than when the speed control is performed. That is, as shown in FIG. 13, the level of the lift at which the water-pumped amount becomes zero (0) is lowest in waveform LNb.

The level of the lift at which the water-pumped amount becomes zero (0) is higher in waveform LNc than waveform LNb, and the level of the lift at which the water-pumped amount becomes zero (0) is highest in waveform LNa.

That is, the decrease in the amount of water pumped by the operation of the drain pump 141 according to the increase in the level of the lift is smaller when the power control is performed with respect to the motor 630 than when the speed control is performed with respect to the motor 630.

Therefore, the drainage can be made within a greater range of lift when the power control is performed, as compared to that when the speed control is performed. That is, when compared to the speed control, the power control makes it possible to set a greater range of lift levels, thereby increasing a freedom of installation.

In FIG. 13, it is illustrated that a water-pumped amount at time point Pmin is identical between waveform LNa representing the power control and wave form LNb representing the speed control, but a water-pumped amount at time point Pmax is much greater in waveform LNa representing the power control than wave form LNb representing the speed control.

That is, the amount of water pumped by the operation of the drain pump 141 is greater when the power control is performed with respect to the motor 630 than when the speed control is performed with respect to the motor 630. Therefore, the drainage time can be further shortened when the power control is performed.

Meanwhile, FIG. 1 illustrates a top loading type machine as a laundry treatment machine, but the drain pump driving apparatus 620 according to an embodiment of the present disclosure may also be applied to a front loading type machine, that is, a drum type machine. This will be described with reference to FIG. 14.

Figure 14:
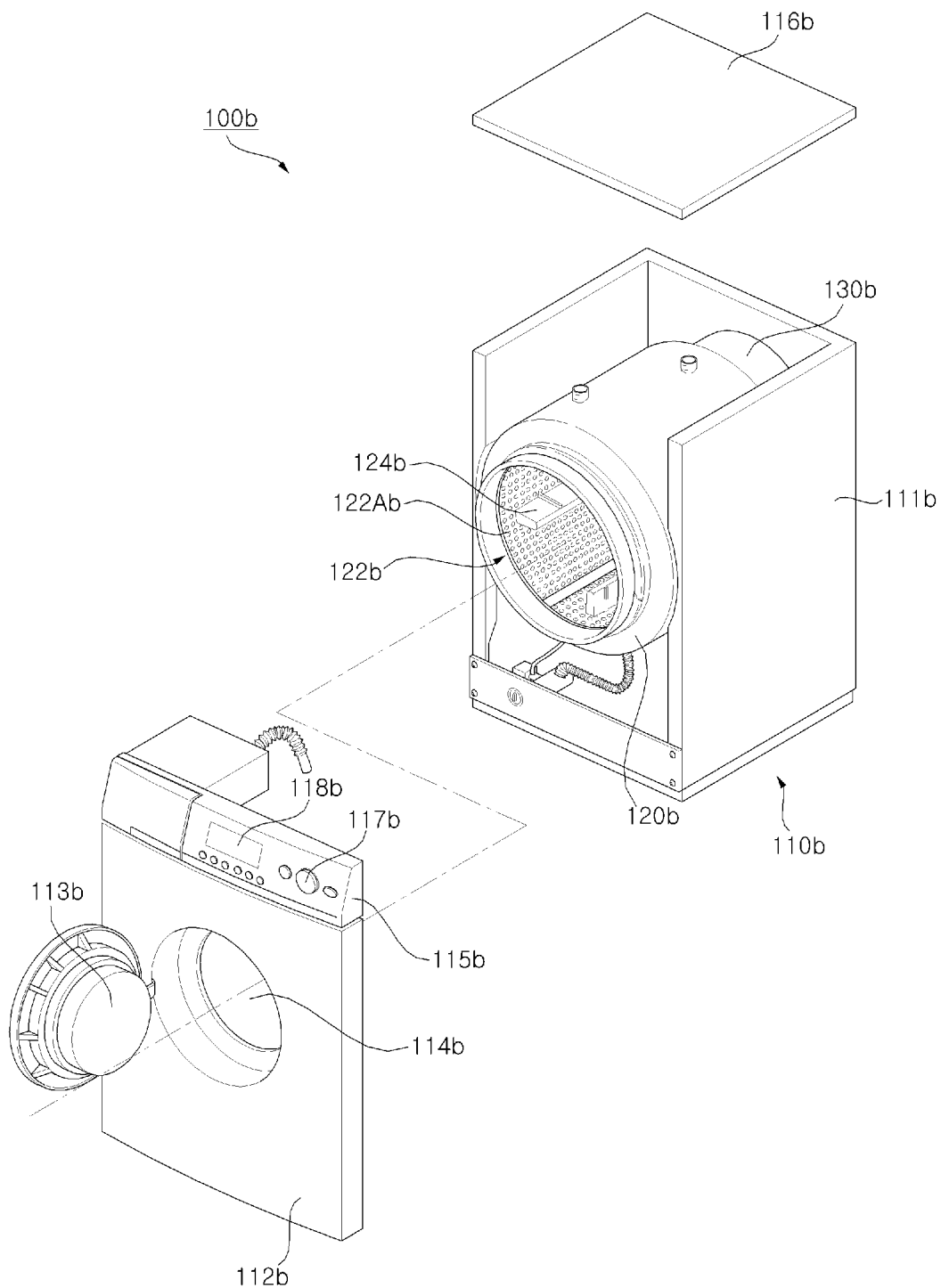
FIG. 14 is a perspective view illustrating a laundry treatment machine according to another embodiment of the present disclosure.

FIG. 14 is a perspective view illustrating a laundry treatment machine according to another embodiment of the present disclosure.

Referring to FIG. 14, the laundry treatment machine 100b according to an embodiment of the present disclosure is a laundry treatment machine in a front loading type in which fabric is inserted into a washing tub through the front of the machine.

Referring to FIG. 14, the laundry treatment machine 100b is a drum-type laundry treatment machine, and includes a casing 110b forming an outer appearance of the laundry treatment machine 100b, a washing tub 120b disposed inside the casing 110b and supported by the casing 110b, a drum 122b that is a washing tub disposed inside the washing tub 120b to wash fabric, a motor 130b for driving the drum 122b, a wash water supply apparatus (not shown) disposed outside a cabinet body 111b to supply wash water into the casing 110b, and a drainage apparatus (not shown) formed under the washing tub 120b to discharge the wash water to the outside.

A plurality of through holes 122Ab are formed in the drum 122b to allow the wash water to pass therethrough, and a lifter 124b may be disposed on an inner surface of the drum 122b such that laundry is lifted to a predetermined height and then falls by gravity when the drum 122b rotates.

The casing 110b includes a cabinet body 111b, a cabinet cover 112b disposed on the front of the cabinet body 111b and coupled to the cabinet body 111b, a control panel 115b disposed on the cabinet cover 112b and coupled to the cabinet body 111b, and a top plate 116b disposed on the control panel 115b and coupled to the cabinet body 111b.

The cabinet cover 112b includes a fabric entrance hole 114b formed to allow fabric to enter and exit therethrough, and a door 113b disposed in such a manner as to be rotatable in a horizontal direction to open or close the fabric entrance hole 114b.

The control panel 115b includes operation keys 117b for controlling an operation state of the laundry treatment machine 100b, and a display 118b disposed on one side of the operation keys 117b to display the operation state of the laundry treatment machine 100b.

The operation keys 117b and the display 118b in the control panel 115b are electrically connected to a controller (not shown), and the controller (not shown) electrically controls each component of the laundry treatment machine 100b. A description about an operation of the controller (not shown) is omitted because the operation of the controller 210b illustrated in FIG. 3 can be referred to.

Meanwhile, an automatic balancer (not shown) may be provided in the drum 122b. The automatic balancer (not shown), which is provided to reduce vibrations generated based on an eccentric amount of laundry accommodated in the drum 122b, may be implemented as a liquid balancer, a ball balancer, or the like.

Meanwhile, the drain pump driving apparatus 620 according to an embodiment of the present disclosure may be applied to various machines such as dishwashers and air conditioners, in addition to the laundry treatment machines 100 and 100b.

The drain pump driving apparatus and the laundry treatment machine including the same according to embodiments of the present disclosure are not limited to the configurations and methods of the above-described embodiments, and various modifications to the embodiments may be made by selectively combining all or some of the embodiments.

Meanwhile, a method for operating the drain pump driving apparatus and the laundry treatment machine according to the present disclosure can be implemented with processor-readable codes in a processor-readable recording medium provided for each of the drain pump driving apparatus and the laundry treatment machine. The processor-readable recording medium includes all kinds of recording devices for storing data that is readable by a processor.

It will be apparent that, although the preferred embodiments of the present disclosure have been illustrated and described above, the present disclosure is not limited to the above-described specific embodiments, and various modifications can be made by those skilled in the art without departing from the gist of the present disclosure as claimed in the appended claims. The modifications should not be understood separately from the technical spirit or prospect of the present disclosure.

What is claimed is:
1. A drain pump driving apparatus comprising:
a motor to drive a drain pump;
a converter to output a direct current (DC) power;
an inverter to convert the DC power at a DC terminal into an alternating current (AC) power based on a switching operation and output the converted AC power to the motor;
an output current detector to detect an output current flowing in the motor; and
a controller configured to, during drainage, drive the motor with a first power based on the output current when a lift is at a first level and drive the motor with the first power when the lift is at a second level that is greater than the first level, wherein the lift is a difference between a water level of a water introduction part through which water flows into the drain pump and a water level of a water discharge part through which the water is discharged out of the drain pump,
wherein the controller is configured to:
as a water level in a washing tub decreases, operate the motor in a first section in which a speed of the motor increases, a second section in which the speed of the motor increases more such that the increase in the second section is less than the increase in the first section, and a third section in which the speed of the motor is constant,
when the power supplied to the motor does not reach the first power during the first section, increase the speed of the motor,
wherein the controller includes:
a speed calculator to calculate a speed of the motor based on voltage information of the motor;
a power calculator to calculate the power based on the output current and a DC terminal voltage;
a power controller to output a speed command value based on the calculated power and a power command value; and
a speed controller to output a voltage command value based on the speed command value and the speed calculated by the speed calculator.

2. The drain pump driving apparatus of claim 1, wherein when the lift is at the first level, the controller is configured to drive the motor with a power within a first allowable range based on the first power, without decreasing over time, from a first time point after the drainage is started until completion of the drainage, and
when the lift is at the second level, the controller is configured to drive the motor with a power within the first allowable range based on the first power, without decreasing over time, from the first time point until completion of the drainage.

3. The drain pump driving apparatus of claim 1, wherein the controller is configured to perform power control with respect to the motor during the drainage,
when the power supplied to the motor does not reach the first power, the controller is configured to increase a speed of the motor, and
when the power supplied to the motor exceeds the first power, the controller is configured to decrease the speed of the motor.

4. The drain pump driving apparatus of claim 3, wherein when the power supplied to the motor reaches the first power, the controller controls the speed of the motor to be constant during the third section.

5. The drain pump driving apparatus of claim 3, wherein the controller controls the output current in the second section to be constant.

6. The drain pump driving apparatus of claim 1, wherein the controller is configured to increase a speed of the motor, during the drainage, as a level of the lift increases.

7. The drain pump driving apparatus of claim 1, wherein the controller is configured to decrease an amount of water pumped by an operation of the drain pump, during the drainage, as a level of the lift increases.

8. The drain pump driving apparatus of claim 1, further comprising:
a second controller to output a switching control signal to the inverter; and
a DC terminal voltage detector to detect the DC terminal voltage of the DC terminal,
wherein the controller calculates a power based on the output current and the DC terminal voltage and outputs the voltage command value based on the calculated power, and
the second controller outputs the switching control signal to the inverter based on the voltage command value.

9. The drain pump driving apparatus of claim 8, wherein the controller is configured to increase the voltage command value and a duty of the switching control signal as level of the output current decreases.

10. The drain pump driving apparatus of claim 8, wherein the second controller outputs voltage information of the motor to the controller based on the voltage command value or the switching control signal.

11. The drain pump driving apparatus of claim 1, wherein the motor includes a brushless DC motor.

12. The drain pump driving apparatus of claim 1, further comprising a DC terminal capacitor disposed at the DC terminal to store the DC power,
wherein the output current detector is disposed between the DC terminal capacitor and the inverter.

13. A drain pump driving apparatus comprising:
a motor to drive a drain pump;
an inverter to convert a direct current (DC) power at a DC terminal into an alternating current (AC) power based on a switching operation and to output the converted AC power to the motor; and
a controller configured to control the inverter, during drainage, to increase a speed of the motor when the power supplied to the motor does not reach a first power and decrease the speed of the motor when the power supplied to the motor exceeds the first power,
wherein the controller is configured to:
as a water level in a washing tub decreases, operate the motor in a first section in which a speed of the motor increases, a second section in which the speed of the motor increases more such that the increase in the second section is less than the increase in the first section, and a third section in which the speed of the motor is constant,
when the power supplied to the motor does not reach the first power during the first section, increase the speed of the motor,
wherein the controller includes:
a speed calculator to calculate a speed of the motor based on voltage information of the motor;
a power calculator to calculate the power based on an output current and a DC terminal voltage;
a power controller to output a speed command value based on the calculated power and a power command value; and
a speed controller to output a voltage command value based on the speed command value and the speed calculated by the speed calculator.

14. A laundry treatment machine comprising:
a washing tub;
a driver to drive the washing tub;
a drain pump; and
a drain pump driving apparatus to drive the drain pump,
wherein the drain pump driving apparatus comprising:
a motor to drive a drain pump;
a converter to output a direct current DC) power;
an inverter to convert the DC power at a DC terminal into an alternating current (AC) power based on a switching operation and output the converted AC power to the motor;

an output current detector to detect an output current flowing in the motor; and a controller configured to, during drainage, drive the motor with a first power based on the output current when a lift is at a first level and drive the motor with the first power when the lift is at a second level that is greater than the first level, wherein the lift is a difference between a water level of a water introduction part through which water flows into the drain pump and a water level of a water discharge part through which the water is discharged out of the drain pump, wherein the controller is configured to:
   as a water level in the washing tub decreases, operate the motor in a first section in which a speed of the motor increases, a second section in which the speed of the motor increases more such that the increase in the second section is less than the increase in the first section, and a third section in which the speed of the motor is constant,
   when the power supplied to the motor does not reach the first power during the first section, increase the speed of the motor, wherein the controller includes:
   a speed calculator to calculate a speed of the motor based on voltage information of the motor;
   a power calculator to calculate the power based on the output current and a DC terminal voltage;
   a power controller to output a speed command value based on the calculated power and a power command value; and
   a speed controller to output a voltage command value based on the speed command value and the speed calculated by the speed calculator.

\* \* \* \* \*